(12) United States Patent
Kumar et al.

(10) Patent No.: US 10,616,669 B2
(45) Date of Patent: Apr. 7, 2020

(54) DYNAMIC MEMORY FOR COMPUTE RESOURCES IN A DATA CENTER

(71) Applicant: INTEL CORPORATION, Santa Clara, CA (US)

(72) Inventors: Mohan J. Kumar, Aloha, OR (US); Murugasamy K. Nachimuthu, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/476,915

(22) Filed: Mar. 31, 2017

(65) Prior Publication Data

US 2018/0027680 A1 Jan. 25, 2018

Related U.S. Application Data

(60) Provisional application No. 62/365,969, filed on Jul. 22, 2016, provisional application No. 62/376,859, (Continued)

(51) Int. Cl.
*H04Q 11/00* (2006.01)
*H03M 7/40* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01);

*G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01);
(Continued)

(58) Field of Classification Search
CPC .................. H04L 67/1008; H04L 43/0882
See application file for complete search history.

(56) References Cited

U.S. PATENT DOCUMENTS 8,082,400 B1 12/2011 Chang et al.
2003/0004925 A1* 1/2003 Knoblock .............. G06Q 10/06
(Continued)

OTHER PUBLICATIONS

International Search Report received for PCT Patent Application No. PCT/US2017/038874, dated Oct. 19, 2017, 3 pages.

*Primary Examiner* — Getente A Yimer

(57) ABSTRACT

Examples may include sleds for a rack in a data center including physical compute resources and memory for the physical compute resources. The memory can be disaggregated, or organized into first level and second level memory. A first sled can comprise the physical compute resources and a first set of physical memory resources while a second sled can comprise a second set of physical memory resources. The first set of physical memory resources can be coupled to the physical compute resources via a local interface while the second set of physical memory resources can be coupled to the physical compute resources via a fabric.

24 Claims, 19 Drawing Sheets

Related U.S. Application Data filed on Aug. 18, 2016, provisional application No. 62/427,268, filed on Nov. 29, 2016.

(51) Int. Cl.

| | |
|---|---|
| H05K 7/14 | (2006.01) |
| G06F 9/54 | (2006.01) |
| G06F 9/38 | (2018.01) |
| G06F 9/30 | (2018.01) |
| H04L 12/931 | (2013.01) |
| H03M 7/30 | (2006.01) |
| G06F 16/901 | (2019.01) |
| G06F 3/06 | (2006.01) |
| H04L 12/811 | (2013.01) |
| G11C 7/10 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.

CPC .......... *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/00* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008*

(2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1442* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y04S 10/54* (2013.01); *Y10S 901/01* (2013.01)

(56) References Cited

U.S. PATENT DOCUMENTS

| | | | |
|---|---|---|---|
| 2009/0204718 A1* | 8/2009 | Lawton | G06F 9/5016 709/230 |
| 2013/0166820 A1* | 6/2013 | Batwara | G06F 12/0246 711/103 |
| 2015/0089100 A1 | 3/2015 | Vijayrao et al. | |
| 2015/0254088 A1 | 9/2015 | Chou et al. | |
| 2015/0334867 A1 | 11/2015 | Faw et al. | |
| 2016/0006808 A1 | 1/2016 | Shrader | |
| 2016/0080482 A1* | 3/2016 | Gilbert | H04L 41/5025 709/226 |
| 2017/0257970 A1* | 9/2017 | Alleman | H05K 7/1489 |
| 2018/0025315 A1* | 1/2018 | Cortes | G06Q 10/087 |

* cited by examiner

FIG. 16

*Logic Flow*
*1600*

Compose virtual computing platforms from physical compute resources and physical memory resources, each of the virtual computing platforms to comprise at least one of the physical compute resources and a portion of the physical memory resources coupled to the at least one of the physical compute resources as first level memory.
*1610*

Dynamically allocate a portion of the physical memory resources to a one of the virtual computing platforms as second level memory.
*1620*

DYNAMIC MEMORY FOR COMPUTE RESOURCES IN A DATA CENTER

RELATED CASE

This application claims priority to United States Provisional Patent Application entitled "Framework and Techniques for Pools of Configurable Computing Resources" filed on Nov. 29, 2016 and assigned Ser. No. 62/427,268; U.S. Provisional Patent Application entitled "Scalable System Framework Prime (SSFP) Omnibus Provisional II" filed on Aug. 18, 2016 and assigned Ser. No. 62/376,859; and United States Provisional Patent Application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally relate to data centers and particularly to memory resources within a data center.

BACKGROUND

Advancements in networking have enabled the rise in pools of physical resources. A pool of physical resources may be formed from a physical infrastructure including disaggregate physical resources, such as, for example, compute and storage resources found in large data centers. The physical infrastructure can include a number of computing systems having processors, memory, storage, networking, power, cooling, etc. Management entities of these data centers can aggregate a selection of the physical resources to form servers and/or physical computing hosts. These hosts can subsequently be allocated to execute system software (e.g., operating systems (OSs), virtual machine managers (VMMs), or the like) and host containers, virtual machines (VMs), and/or applications.

BRIEF DESCRIPTION OF THE DRAWINGS

FIG. 16 illustrates an eighth example data center.

DETAILED DESCRIPTION

Figure 1:
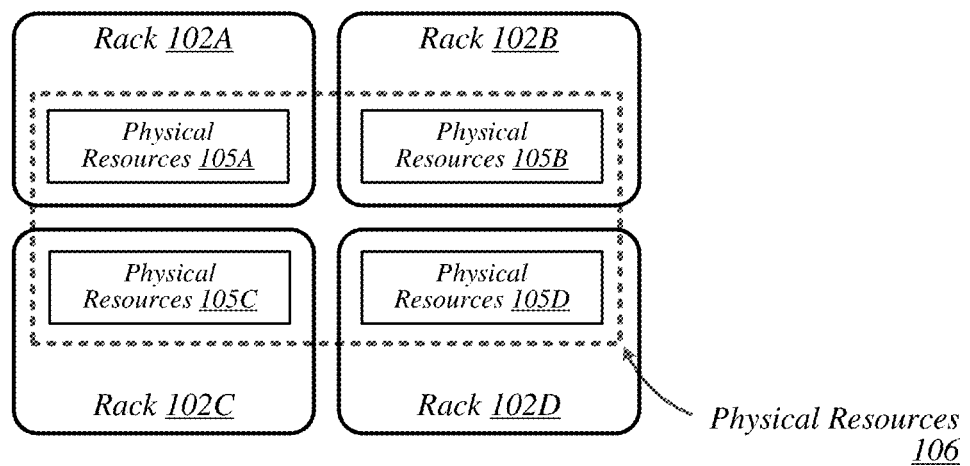
FIG. 1 illustrates a first example data center.

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

As noted, some of the physical resources can be compute resources (e.g., central processing units, or the like) or accelerator resources (e.g., application specific integrated circuits, field-programmable gate arrays, or the like). Furthermore, the physical resources include memory resources.

The present disclosure provides a disaggregated memory architecture for compute resources in a data center. For example, the present disclosure provides a sled for a data center comprising a number of compute resources, a first quantity of physical resource memory coupled to the compute resources via a first interface and a second quantity of physical resource memory coupled to the compute resources via a second interface. In general, the first interface can be "faster" (e.g., lower latency, greater bandwidth, or the like) than the second interface. As such, the first quantity of memory can be referred to as "first level memory" while the second quantity of memory can be referred to as "second level memory."

It is noted, that the terms "first level" and "second level" may not imply a physical or geographic distance, separation, or hierarchy between the memories and the compute resources. Instead, the terms "first level" and "second level" are intended to imply a speed, latency, bandwidth, or the like of the memory resources. For example, first level memory can be faster (e.g., lower latency, greater operating frequency, higher bandwidth, or the like) than second level memory. In some examples, first level memory may be faster than second level memory due to the type of memories (e.g., first level memory can be a different type of memory than second level memory) or due to the interconnects between the compute and/or accelerator resources and the memory resources.

The present disclosure provides that second level memory resources can be dynamically allocated between compute resources within a data center. For example, a sled (or sleds) housing memory resources can be provided and dynamically (e.g., during operation, at initialization, or the like) allocated to sleds comprising compute resources and first level memory resources. Thus, second level memory resources can be dynamically allocated to combinations of compute resources in a data center. In some examples, first level memory can be configured to operate as a "cache" to second level memory. As another example, the disaggregation of memory resources as described herein can be provided to reduce a physical size and/or power requirement of sleds within a data center as first level memory resources on a sled in a data center can be supplemented with second level memory resources from another sled in the data center.

This is described in greater detail below. However, first, a general description of a data center in which the accelerator resources with shared memory can be implemented is described. In particular, FIGS. 1 to 10 describe data centers, racks, and sleds according to examples of the present disclosure. FIGS. 11 to 14, FIGS. 15A to 15C, and FIG. 16 describe arrangements of physical compute resources and first level and second level memory, according to examples of the present disclosure.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), graphics processing units (GPUs), memory, interconnect components, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical printed circuit boards (PCBs). In other words, the sleds are shorter from the front to the back, where cooling fans are located. This decreases the length of the path that air must to travel across the components on the PCB. Further, the components on the sled are spaced further apart than in typical PCBs, and the components are arranged to reduce or eliminate shadowing (i.e., one component in the air flow path of another component). In the illustrative embodiment, processing components such as the processors are located on a top side of a sled while first level memory, such as dual in-line memory modules (DIMMs), are located on a bottom side of the sled. It is noted, that a DIMM can comprise volatile memory modules, non-volatile memory modules, or a combination of both. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures which may be in accordance to standards, such as Institute of Electrical and Electronics Engineers (IEEE) 802.3-2015 standard (Ethernet) or any predecessors, revisions, or variants thereof, and other architectures, such as Intel® Omni-Path®. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, field programmable gate arrays (FPGAs), application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A to 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in some embodiments, the racks 102A to 102D include integrated power sources that receive a greater voltage than is typical for power sources. The increased voltage enables the power sources to provide additional power to the components on each sled, enabling the components to operate at higher than typical frequencies.

Figure 2:
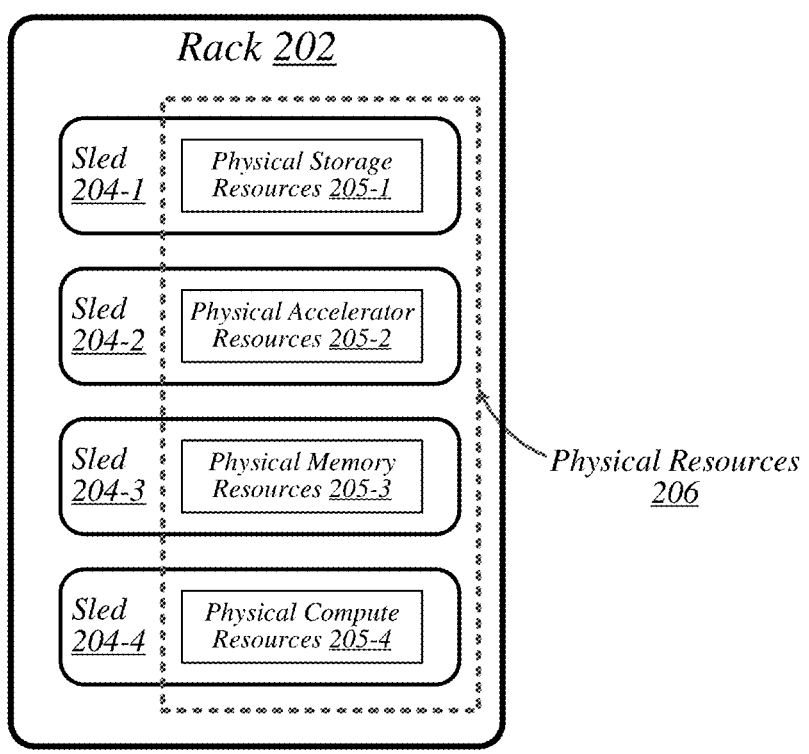
FIG. 2 illustrates a first example rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in this figure, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources 205-1 to 205-4 comprised in the sleds 204-1 to 204-4 of rack 202. As depicted in this illustrative embodiment, physical resources 205-1 to 205-4 include physical storage resources 205-1, physical accelerator resources 205-2, physical memory resources 205-3, and physical compute resources 205-4. The embodiments are not limited to this example. Each sled may contain a pool of each of the various types of physical resources (e.g., compute, memory, accelerator, storage). By having robotically accessible and robotically-manipulatable sleds comprising disaggregated resources, each type of resource can be upgraded independently of each other and at their own optimized refresh rate.

Groups of the physical accelerator resources 205-2 can share memory, as described in greater detail below, for example, with reference to FIGS. 11-14. Furthermore, it is noted, the number of sleds 204-1 to 204-4 and the arrangement (e.g., column, row, etc.) is depicted at a quantity and in an arrangement to facilitate understanding. However, examples are not limited in these contexts.

Figure 3:
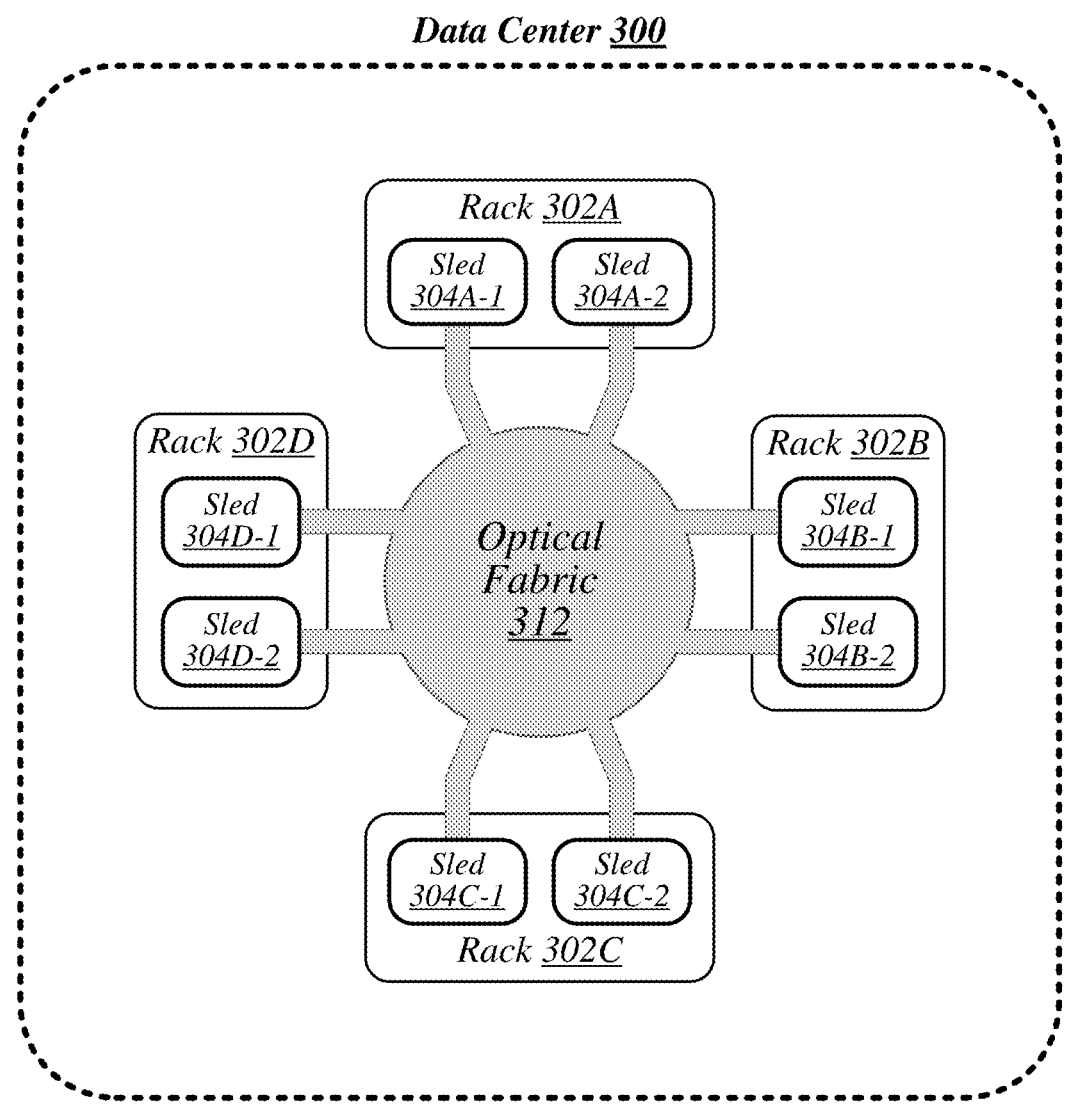
FIG. 3 illustrates a second example data center.

FIG. 3 illustrates an example of a data center 300 that may generally be representative of one in/for which one or more techniques described herein may be implemented according to various embodiments. As shown in this figure, data center 300 may feature an optical fabric 312. Optical fabric 312 may generally comprise a combination of optical signaling media (such as optical cabling) and optical switching infrastructure via which any particular sled in data center 300 can send signals to (and receive signals from) each of the other sleds in data center 300. The signaling connectivity that optical fabric 312 provides to any given sled may include connectivity both to other sleds in a same rack and sleds in other racks.

In the particular non-limiting example depicted here, data center 300 includes four racks 302A to 302D. Racks 302A to 302D house respective pairs of sleds 304A-1 and 304A-2, 304B-1 and 304B-2, 304C-1 and 304C-2, and 304D-1 and 304D-2. Thus, in this example, data center 300 comprises a total of eight sleds. Via optical fabric 312, each such sled may possess signaling connectivity with each of the seven other sleds in data center 300. For example, via optical fabric 312, sled 304A-1 in rack 302A may possess signaling connectivity with sled 304A-2 in rack 302A, as well as the six other sleds 304B-1, 304B-2, 304C-1, 304C-2, 304D-1, and 304D-2 that are distributed among the other racks 302B, 302C, and 302D of data center 300.

Figure 4:
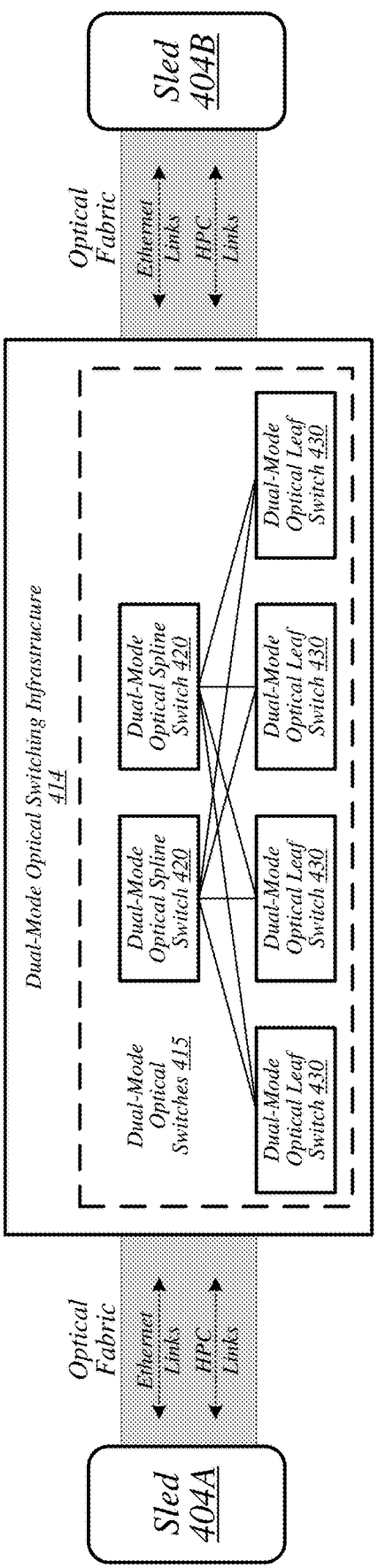
FIG. 4 illustrates a data center connectivity scheme.

FIG. 4 illustrates an overview of a connectivity scheme 400 that may generally be representative of link-layer connectivity that may be established in some embodiments among the various sleds of a data center, such as any of example data centers 100 and 300 of FIGS. 1 and 3. Connectivity scheme 400 may be implemented using an optical fabric that features a dual-mode optical switching infrastructure 414. Dual-mode optical switching infrastructure 414 may generally comprise a switching infrastructure that is capable of receiving communications according to multiple link-layer protocols via a same unified set of optical signaling media, and properly switching such communications. In various embodiments, dual-mode optical switching infrastructure 414 may be implemented using one or more dual-mode optical switches 415. In various embodiments, dual-mode optical switches 415 may generally comprise high-radix switches. In some embodiments, dual-mode optical switches 415 may comprise multi-ply switches, such as four-ply switches. In various embodiments, dual-mode optical switches 415 may feature integrated silicon photonics that enable them to switch communications with significantly reduced latency in comparison to conventional switching devices. In some embodiments, dual-mode optical switches 415 may constitute leaf switches 430 in a leaf-spine architecture additionally including one or more dual-mode optical spine switches 420.

In various embodiments, dual-mode optical switches may be capable of receiving both Ethernet protocol communications carrying Internet Protocol (IP packets) and communications according to a second, high-performance computing (HPC) link-layer protocol (e.g., Intel® Omni-Path Architecture®, Infiniband®, or the like) via optical signaling media of an optical fabric. As reflected in this figure, with respect to any particular pair of sleds 404A and 404B possessing optical signaling connectivity to the optical fabric, connectivity scheme 400 may thus provide support for link-layer connectivity via both Ethernet links and HPC links. Thus, both Ethernet and HPC communications can be supported by a single high-bandwidth, low-latency switch fabric. The embodiments are not limited to this example.

Figure 5:
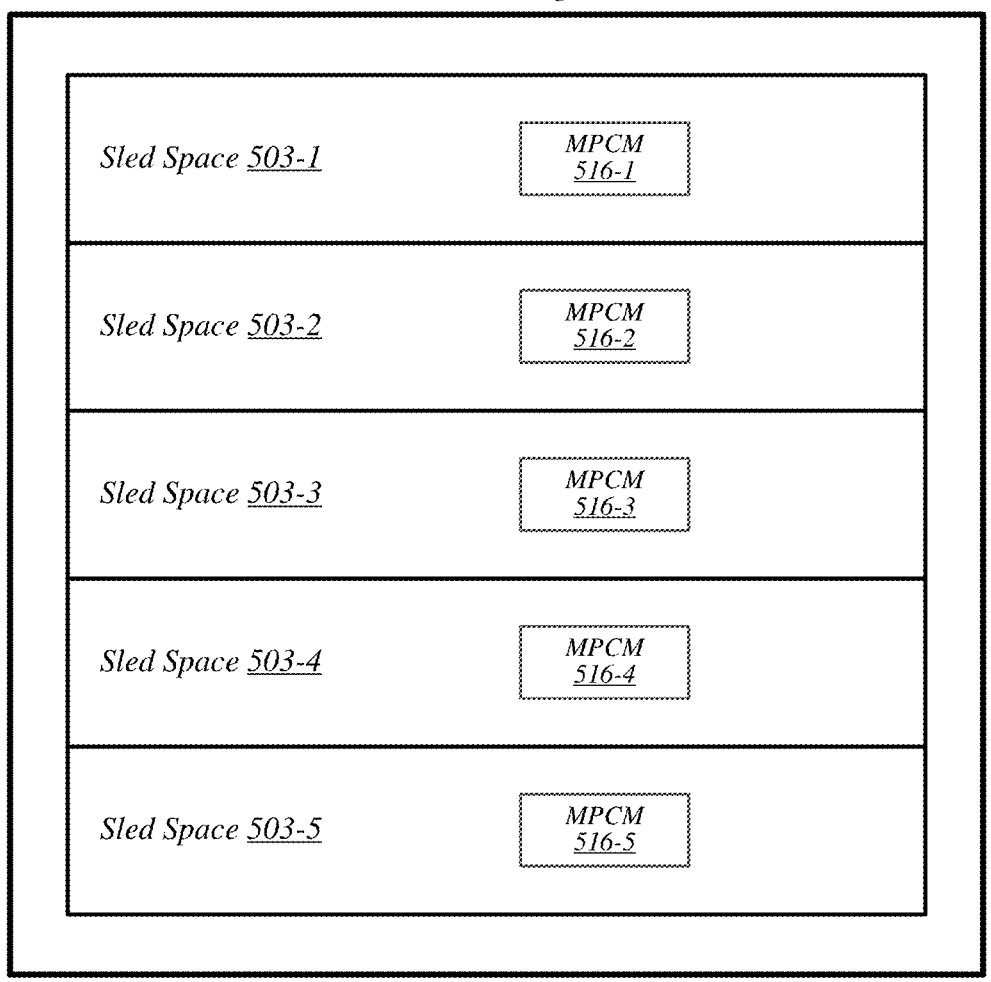
FIG. 5 illustrates a second example rack.

FIG. 5 illustrates a general overview of a rack architecture 500 that may be representative of an architecture of any particular one of the racks depicted herein. As reflected in this figure, rack architecture 500 may generally feature a plurality of sled spaces (or sled bays) into which sleds may be inserted, each of which may be robotically-accessible via a rack access region 501. In this particular non-limiting example, rack architecture 500 features five sled spaces 503-1 to 503-5. Sled spaces 503-1 to 503-5 feature respective multi-purpose connector modules (MPCMs) 516-1 to 516-5. When a sled is inserted into any given one of sled spaces 503-1 to 503-5, the corresponding MPCM may couple with a counterpart MPCM of the inserted sled. This coupling may provide the inserted sled with connectivity to both signaling infrastructure and power infrastructure of the rack in which it is housed.

Figure 6:
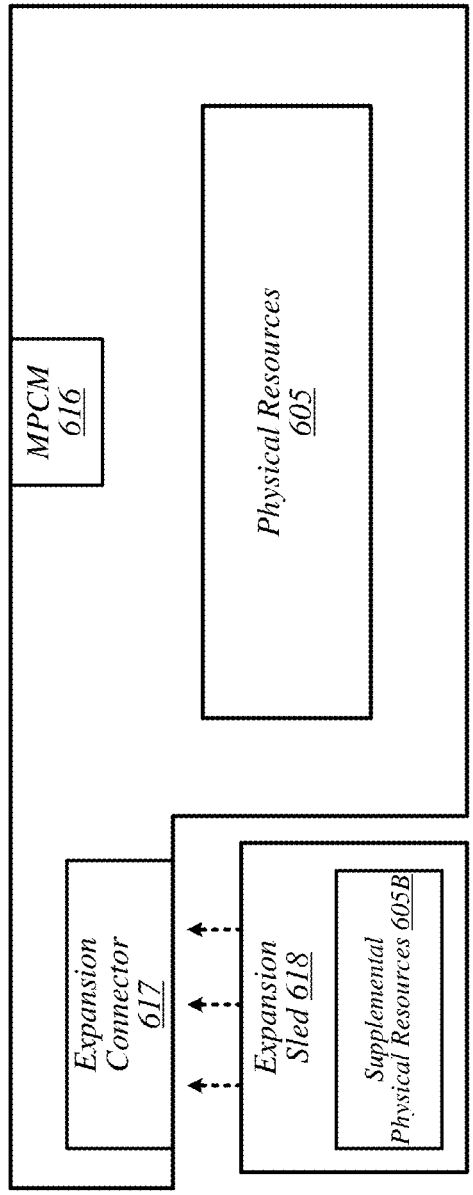
FIG. 6 illustrates a first example sled.

Included among the types of sleds to be accommodated by rack architecture 500 may be one or more types of sleds that feature expansion capabilities. FIG. 6 illustrates an example of a sled 604 that may be representative of a sled of such a type. As shown in this figure, sled 604 may comprise a set of physical resources 605, as well as an MPCM 616 designed to couple with a counterpart MPCM when sled 604 is inserted into a sled space such as any of sled spaces 503-1 to 503-5 of FIG. 5.

Sled 604 may also feature an expansion connector 617. Expansion connector 617 may generally comprise a socket, slot, or other type of connection element that is capable of accepting one or more types of expansion modules, such as an expansion sled 618. By coupling with a counterpart connector on expansion sled 618, expansion connector 617 may provide physical resources 605 with access to supplemental computing resources 605B residing on expansion sled 618. The embodiments are not limited in this context. In some examples, expansion sled 618 can comprise physical accelerator resources (e.g., comprising FPGAs, GPUs, memory, or a combination of FPGAs, GPUs, and memory.

Figure 7:
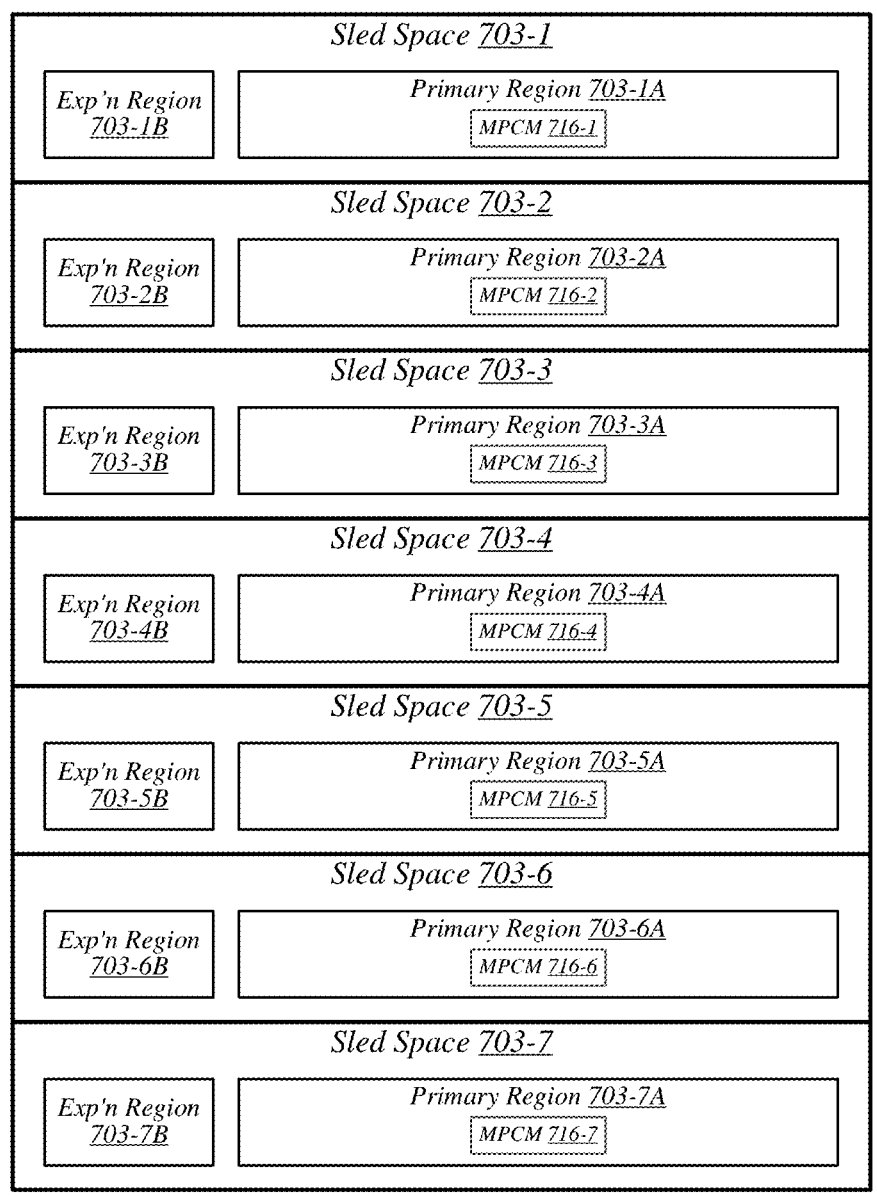
FIG. 7 illustrates a third example rack.

FIG. 7 illustrates an example of a rack architecture 700 that may be representative of a rack architecture that may be implemented in order to provide support for sleds featuring expansion capabilities, such as sled 604 of FIG. 6. In the particular non-limiting example depicted in FIG. 7, rack architecture 700 includes seven sled spaces 703-1 to 703-7, which feature respective MPCMs 716-1 to 716-7. Sled spaces 703-1 to 703-7 include respective primary regions 703-1A to 703-7A and respective expansion regions 703-1B to 703-7B.

With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 618 of FIG. 6, in the event that the inserted sled is configured with such a module.

Figure 8:
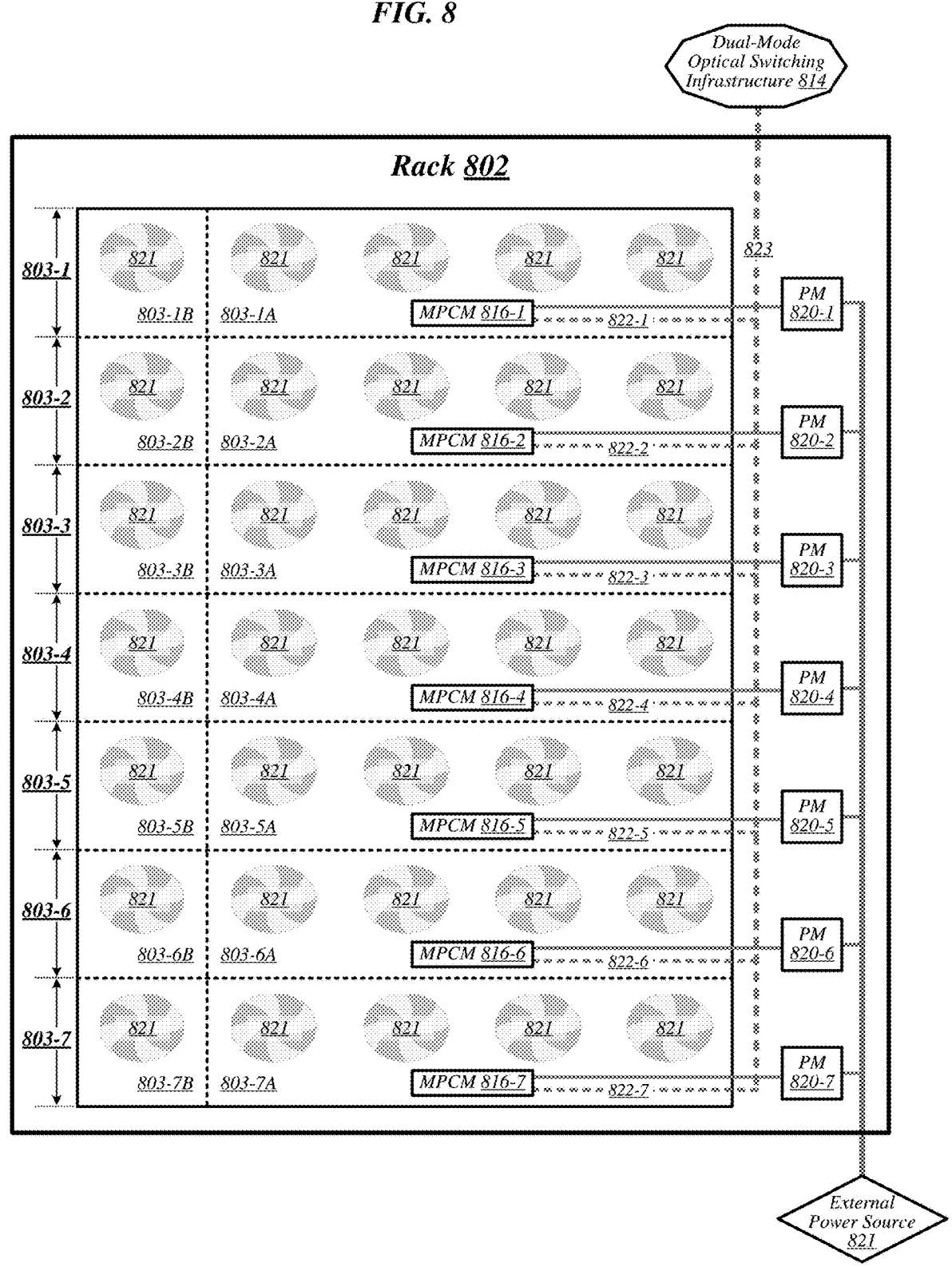
FIG. 8 illustrates a fourth example rack.

FIG. 8 illustrates an example of a rack 802 that may be representative of a rack implemented according to rack architecture 700 of FIG. 7 according to some embodiments. In the particular non-limiting example depicted in FIG. 8, rack 802 features seven sled spaces 803-1 to 803-7, which include respective primary regions 803-1A to 803-7A and respective expansion regions 803-1B to 803-7B. In various embodiments, temperature control in rack 802 may be implemented using an air cooling system. For example, as reflected in FIG. 8, rack 802 may feature a plurality of fans 819 that are generally arranged to provide air cooling within the various sled spaces 803-1 to 803-7. In some embodiments, the height of the sled space is greater than the conventional "1U" server height. In such embodiments, fans 819 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 816-1 to 816-7 may be configured to provide inserted sleds with access to power sourced by respective power modules 820-1 to 820-7, each of which may draw power from an external power source 821. In various embodiments, external power source 821 may deliver alternating current (AC) power to rack 802, and power modules 820-1 to 820-7 may be configured to convert such AC power to direct current (DC) power to be sourced to inserted sleds. In some embodiments, for example, power modules 820-1 to 820-7 may be configured to convert 277-volt AC power into 12-volt DC power for provision to inserted sleds via respective MPCMs 816-1 to 816-7. The embodiments are not limited to this example.

MPCMs 816-1 to 816-7 may also be arranged to provide inserted sleds with optical signaling connectivity to a dual-mode optical switching infrastructure 814, which may be the same as—or similar to—dual-mode optical switching infrastructure 414 of FIG. 4. In various embodiments, optical connectors contained in MPCMs 816-1 to 816-7 may be designed to couple with counterpart optical connectors contained in MPCMs of inserted sleds to provide such sleds with optical signaling connectivity to dual-mode optical switching infrastructure 814 via respective lengths of optical cabling 822-1 to 822-7. In some embodiments, each such length of optical cabling may extend from its corresponding MPCM to an optical interconnect loom 823 that is external to the sled spaces of rack 802. In various embodiments, optical interconnect loom 823 may be arranged to pass through a support post or other type of load-bearing element of rack 802. Because inserted sleds connect to an optical switching infrastructure via MPCMs, the resources typically spent in manually configuring the rack cabling to accommodate a newly inserted sled can be saved.

Figure 9:
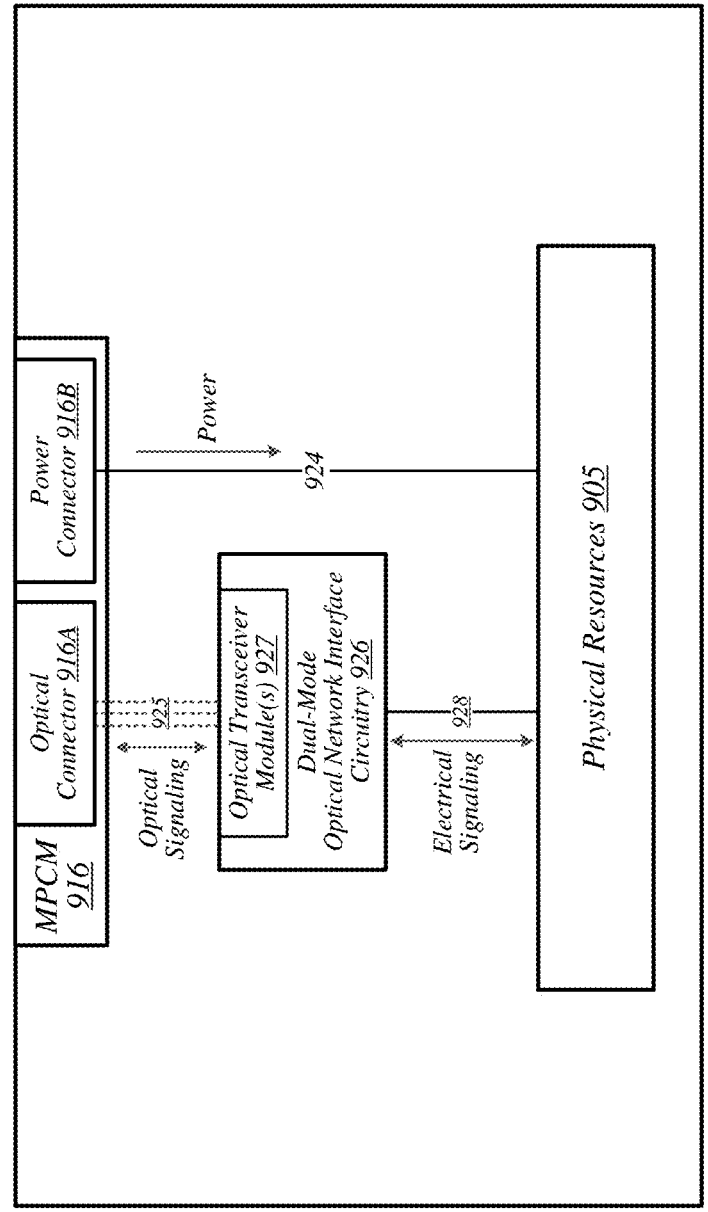
FIG. 9 illustrates a second example sled.

FIG. 9 illustrates an example of a sled 904 that may be representative of a sled designed for use in conjunction with rack 802 of FIG. 8 according to some embodiments. Sled 904 may feature an MPCM 916 that comprises an optical connector 916A and a power connector 916B, and that is designed to couple with a counterpart MPCM of a sled space in conjunction with insertion of MPCM 916 into that sled space. Coupling MPCM 916 with such a counterpart MPCM may cause power connector 916 to couple with a power connector comprised in the counterpart MPCM. This may generally enable physical resources 905 of sled 904 to source power from an external source, via power connector 916 and power transmission media 924 that conductively couples power connector 916 to physical resources 905.

Sled 904 may also include dual-mode optical network interface circuitry 926. Dual-mode optical network interface circuitry 926 may generally comprise circuitry that is capable of communicating over optical signaling media according to each of multiple link-layer protocols supported by dual-mode optical switching infrastructure 814 of FIG. 8. In some embodiments, dual-mode optical network interface circuitry 926 may be capable both of Ethernet protocol communications and of communications according to a second, high-performance protocol that offers significantly greater throughput and significantly reduced latency relative to Ethernet. In various embodiments, dual-mode optical network interface circuitry 926 may include one or more optical transceiver modules 927, each of which may be capable of transmitting and receiving optical signals over each of one or more optical channels. The embodiments are not limited in this context.

Coupling MPCM 916 with a counterpart MPCM of a sled space in a given rack may cause optical connector 916A to couple with an optical connector comprised in the counterpart MPCM. This may generally establish optical connectivity between optical cabling of the sled and dual-mode optical network interface circuitry 926, via each of a set of optical channels 925. Dual-mode optical network interface circuitry 926 may communicate with the physical resources 905 of sled 904 via electrical signaling media 928. In addition to the dimensions of the sleds and arrangement of components on the sleds to provide improved cooling and enable operation at a relatively higher thermal envelope (e.g., 250 Watts(W)), as described above with reference to FIG. 8, in some embodiments, a sled may include one or more additional features to facilitate air cooling, such as a heat pipe and/or heat sinks arranged to dissipate heat generated by physical resources 905. It is worthy of note that although the example sled 904 depicted in FIG. 9 does not feature an expansion connector, any given sled that features the design elements of sled 904 may also feature an expansion connector according to some embodiments.

Figure 10:
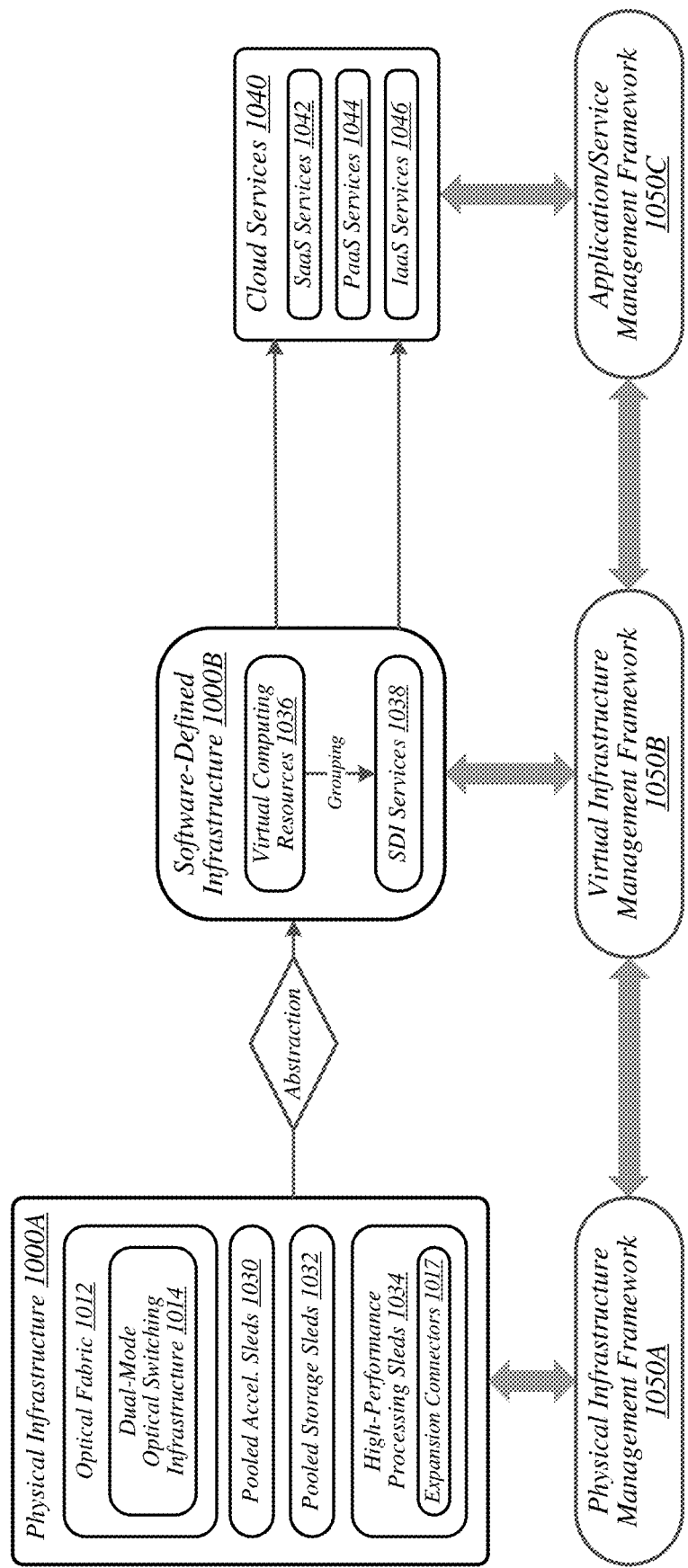
FIG. 10 illustrates a third example data center.

FIG. 10 illustrates an example of a data center 1000 that may generally be representative of one in/for which one or more techniques described herein may be implemented according to various embodiments. As reflected in this figure, a physical infrastructure management framework 1050A may be implemented to facilitate management of a physical infrastructure 1000A of data center 1000. In various embodiments, one function of physical infrastructure management framework 1050A may be to manage automated maintenance functions within data center 1000, such as the use of robotic maintenance equipment to service computing equipment within physical infrastructure 1000A. In some embodiments, physical infrastructure 1000A may feature an advanced telemetry system that performs telemetry reporting that is sufficiently robust to support remote automated management of physical infrastructure 1000A. In various embodiments, telemetry information provided by such an advanced telemetry system may support features such as failure prediction/prevention capabilities and capacity planning capabilities. In some embodiments, physical infrastructure management framework 1050A may also be configured to manage authentication of physical infrastructure components using hardware attestation techniques. For example, robots may verify the authenticity of components before installation by analyzing information collected from a radio frequency identification (RFID) tag associated with each component to be installed.

As depicted, the physical infrastructure 1000A of data center 1000 may comprise an optical fabric 1012, which may include a dual-mode optical switching infrastructure 1014. Optical fabric 1012 and dual-mode optical switching infrastructure 1014 may be the same as—or similar to—optical fabric 312 of FIG. 3 and dual-mode optical switching infrastructure 414 of FIG. 4, respectively, and may provide high-bandwidth, low-latency, multi-protocol connectivity among sleds of data center 1000. As discussed above, with reference to FIG. 1, in various embodiments, the availability of such connectivity may make it feasible to disaggregate and dynamically pool resources such as processors, accelerators, memory, and storage. In some embodiments, for example, one or more pooled accelerator sleds 1030 may be included among the physical infrastructure 1000A of data center 1000, each of which may comprise a pool of accelerator resources—such as co-processors and/or field-programmable gate arrays (FPGAs), for example—that is available globally accessible to other sleds via optical fabric 1012 and dual-mode optical switching infrastructure 1014.

In another example, in various embodiments, one or more pooled storage sleds 1032 may be included among the physical infrastructure 1000A of data center 1000, each of which may comprise a pool of storage resources that is available globally accessible to other sleds via optical fabric 1012 and dual-mode optical switching infrastructure 1014. In some embodiments, such pooled storage sleds 1032 may comprise pools of storage devices, such as, for example, solid-state drives (SSDs), hard disk drives, compact disk (CD) drives, digital video disk (DVD) drives, or some combination of storage devices, such as, a hybrid disk drive comprising both magnetic and solid-state storage media. In various embodiments, one or more high-performance processing sleds 1034 may be included among the physical infrastructure 1000A of data center 1000. In some embodiments, high-performance processing sleds 1034 may comprise pools of high-performance processors, as well as cooling features that enhance air cooling to yield a higher thermal envelope of up to 250 W or more. In various embodiments, any given high-performance processing sled 1034 may feature an expansion connector 1017 that can accept a second level memory expansion sled, such that the second level memory that is locally available to that high-performance processing sled 1034 is disaggregated from the processors and first level memory comprised on that sled. In some embodiments, such a high-performance processing sled 1034 may be configured with second level memory using an expansion sled that comprises a low-latency solid-state memory, such as, a DIMM comprising solid-state memory. The optical infrastructure allows for compute resources on one sled to utilize remote accelerator/FPGA, memory, and/or storage resources that are disaggregated on a sled located on the same rack or any other rack in the data center. The remote resources can be located one switch jump away or two-switch jumps away in the spine-leaf network architecture described above with reference to FIG. 4. The embodiments are not limited in this context.

In various embodiments, one or more layers of abstraction may be applied to the physical resources of physical infrastructure 1000A in order to define a virtual infrastructure, such as a software-defined infrastructure 1000B. In some embodiments, virtual computing resources 1036 of software-defined infrastructure 1000B may be allocated to support the provision of cloud services 1040. In various embodiments, particular sets of virtual computing resources 1036 may be grouped for provision to cloud services 1040 in the form of software defined infrastructure (SDI) services 1038. Examples of cloud services 1040 may include—without limitation—software as a service (SaaS) services 1042, platform as a service (PaaS) services 1044, and infrastructure as a service (IaaS) services 1046.

In some embodiments, management of software-defined infrastructure 1000B may be conducted using a virtual infrastructure management framework 1050B. In various embodiments, virtual infrastructure management framework 1050B may be designed to implement workload fingerprinting techniques and/or machine-learning techniques in conjunction with managing allocation of virtual computing resources 1036 and/or SDI services 1038 to cloud services 1040. In some embodiments, virtual infrastructure management framework 1050B may use/consult telemetry data in conjunction with performing such resource allocation. In various embodiments, an application/service management framework 1050C may be implemented in order to provide quality of service (QoS) management capabilities for cloud services 1040.

In particular, the virtual infrastructure management framework 1050B can compose virtual computing platforms (sometimes referred to as virtual computing devices) from elements of physical infrastructure 1000A. Furthermore, with some examples, ones of pooled accelerator sleds 1030 can be dynamically allocated to such virtual computing platforms, for example, to support various ones of could services 1040. The embodiments are not limited in this context.

Figure 11:
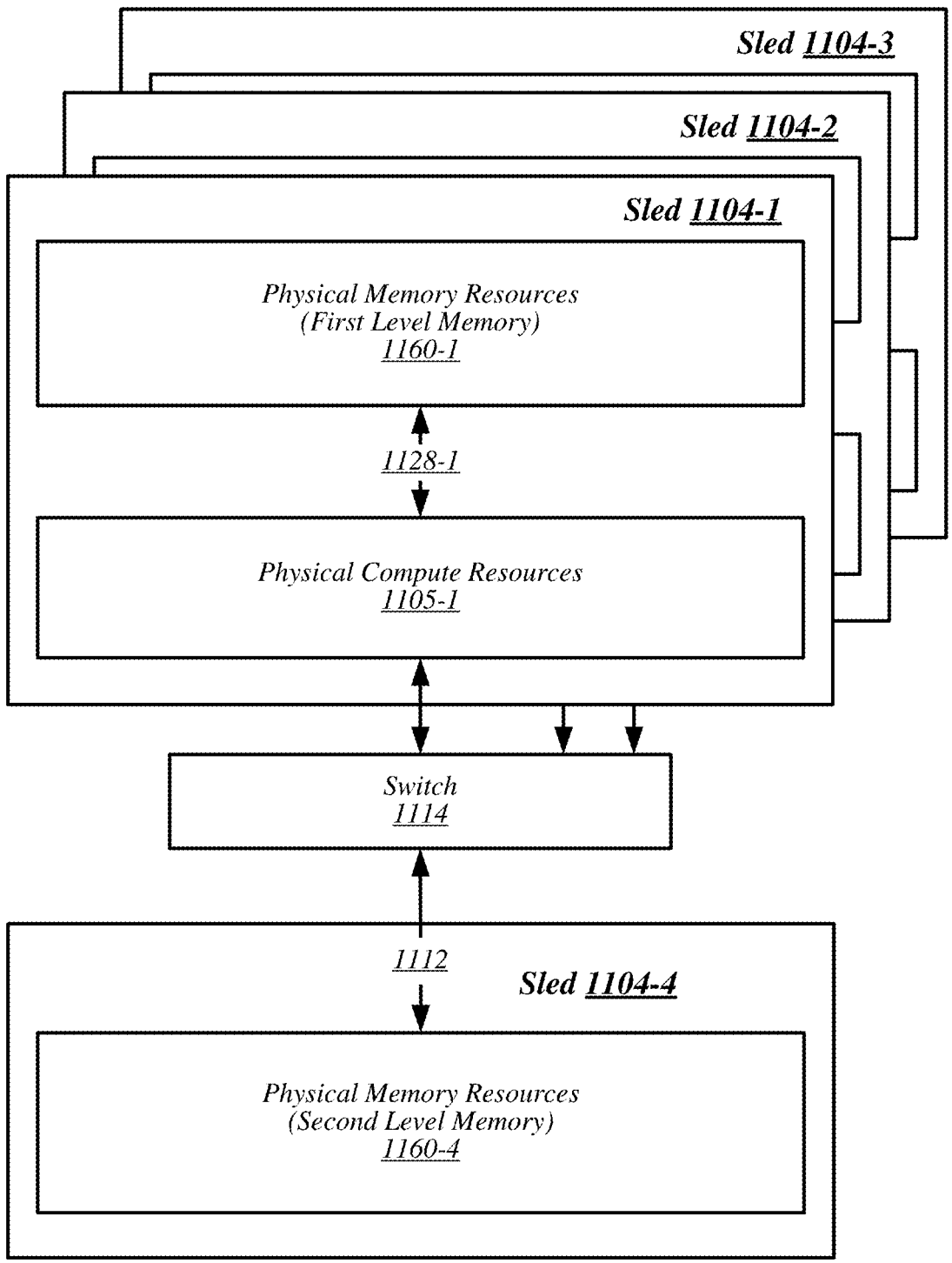
FIG. 11 illustrates a fourth example data center.

FIG. 11 illustrates an example data center 1100. In this illustrative example, data center 1100 comprises a number of sleds 1104, which each comprise a quantity of physical memory resources 1160. In general, physical memory resources 1160 can be any of a variety of computer readable memories including volatile memory and non-volatile memory.

For example, physical memory resources 1160 can be a volatile memory, which may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.orgwww.jedec.org). Such standards (and similar standards) may be referred to as DDR-based standards and communication interfaces of the storage devices that implement such standards may be referred to as DDR-based interfaces.

As another example, physical memory resources 1160 can be non-volatile memory, which may be a storage medium that does not require power to maintain the stat of data stored by the medium. Non-limiting examples of non-volatile memory may include Embodiments may be applied to any memory device that comprise non-volatile memory. In one embodiment, the memory device is a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance.

Data center 1100 is depicted including sleds 1104-1, 1104-2, 1104-3 and 1104-4 where sled 1104-1 to 1104-3 each include physical memory resources and compute resources. Sleds 1104-1 to 1104-3 each include physical memory resources 1160-1 to 1160-3, respectively and compute resources 1105-1 to 1105-3, respectively.

Sled 1104-4 includes physical memory resources 1160-4. The physical compute resources 1105 of each sled 1104-1 to 1104-3 are coupled of respective physical memory resources 1160 of each sled. For example, physical compute resources 1105-1 of sled 1104-1 are coupled to physical memory resources 1160-1 of sled 1104-1. In this manner, physical compute resources 1105 can utilize (e.g., read, write, or the like) the memory of physical memory resources provided on each respective sled.

In some examples, physical compute resources 1105 can be coupled to physical memory resources 1160 housed on the same sled (e.g., physical compute resources 1105-1 coupled to physical memory resources 1160-1) via a local interface 1128. Local interface 1128 can be implemented according to double-data rate fourth generation (DDR4) synchronous dynamic random-access memory (SDRAM) Specification, Rev. A, published in November 2013, future DDR standards, a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.orgwww.jedec.org). Such standards (and similar standards) may be referred to as DDR-based standards and communication interfaces of the storage devices that implement such standards may be referred to as DDR-based interfaces. Furthermore, data center 1100 includes sled 1104-4 having physical memory resources 1160-4. Physical memory resources 1160-4 of sled 1104-4 can be coupled to any combination of the physical compute resources 1105 of the other sleds 1104 in data center 1100. In some examples, physical memory resources 1160-4 can be coupled to physical compute resources 1105 via fabric interface 1112 and fabric switch 1114 (e.g., like fabric switch 414 of FIG. 4). Thus, it may be said that physical memory resources 1160-1 to 1160-3 are first level memory resources to respective compute resources 1105-1 to 1105-3 while physical memory resources 1160-4 are second level memory resources to the compute resources 1105-1 to 1105-3. It is noted, that the terms "first level" and "second level" may not imply a physical or geographic distance between the memories and the compute resources. Instead, the terms "first level" and "second level" are intended to imply a speed, latency, bandwidth, or the like of the memory resources. For example, first level memory (e.g., memory 1160-1 to 1160-3) can be faster (e.g., lower latency, greater operating frequency, higher bandwidth, or the like) than second level memory (e.g., memory 1160-4). In some examples, first level memory 1160-1 to 160-3 may be faster than second level memory 1160-4 due to the type of memories (e.g., first level memory 1160-1 to 1160-3 can be a different type of memory than second level memory 1160-4) or due to the interconnects 1128 and 1112. Examples are not limited in these contexts. For example, in some implementations, first level memory 1160-1 to 1160-3 can be a type of volatile memory while second level memory 1160-4 can be a type of non-volatile memory, such as, byte-addressable write-in place non-volatile memory, or the like.

In some examples, second level memory resources (e.g., physical memory resources 1160-4) can be arranged to be exclusively coupled to physical compute resources of a sled or can be shared between physical compute resources disposed on different sleds. The allocations (e.g., exclusive, shared, or the like) can be dynamic and change during operation. For example, FIG. 12 depicts a data center 1200 where second level memory resources exclusively coupled to compute resources of a sled while FIG. 13 depicts the data center 1200 where second level memory resources shared between multiple sleds.

Figure 12:
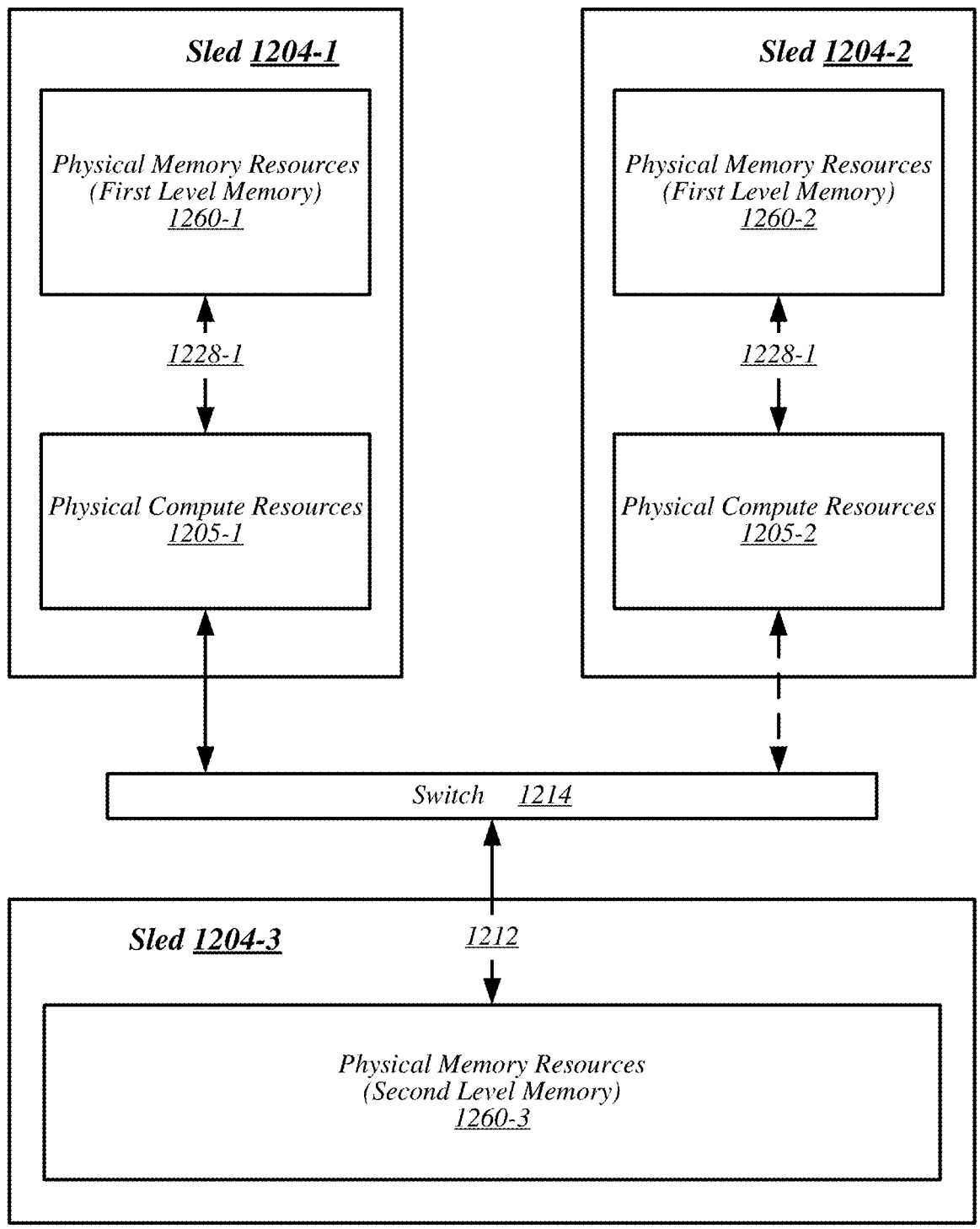
FIG. 12 illustrates a fifth example data center.
Figure 13:
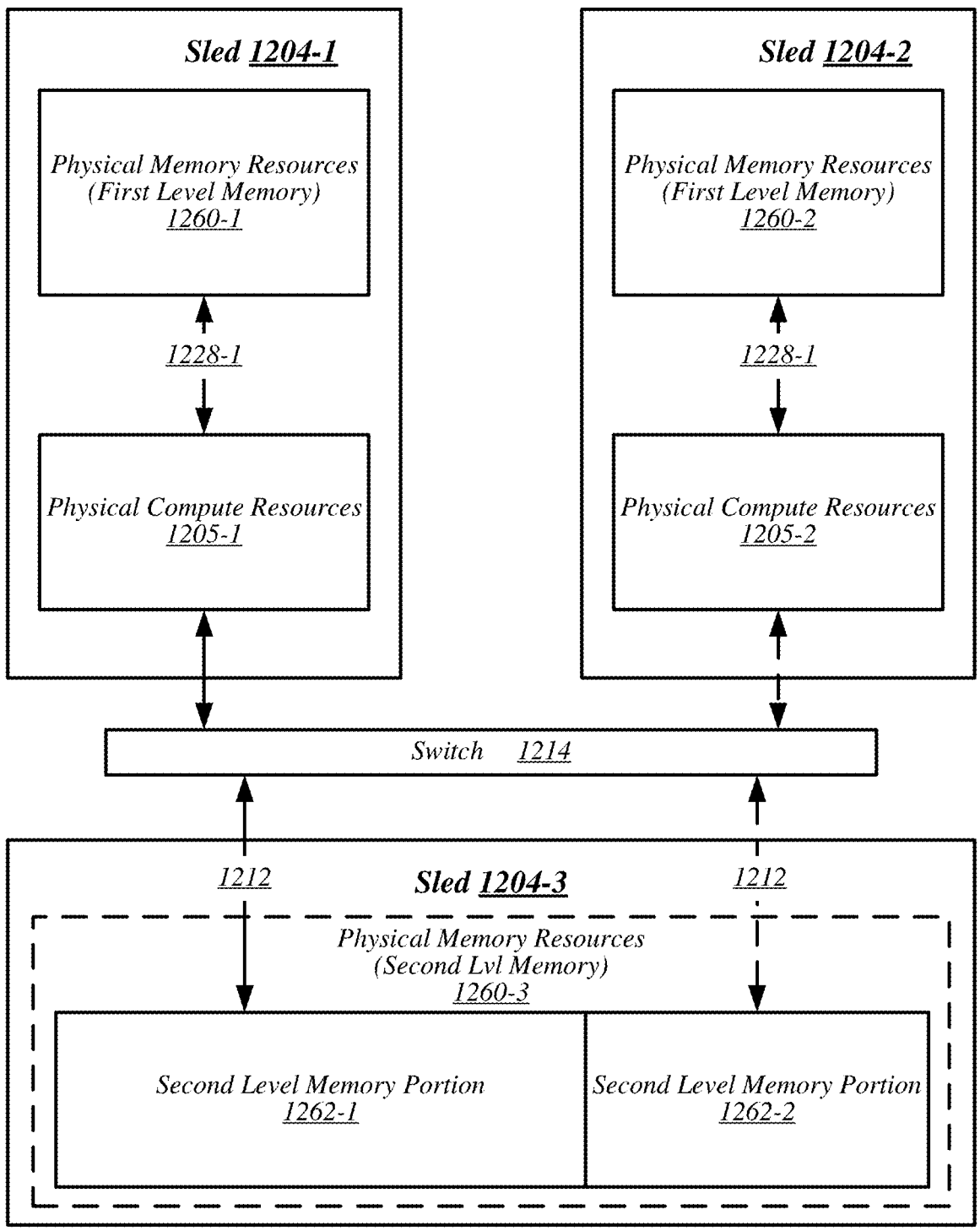
FIG. 13 illustrates a third example sled.

FIG. 12 illustrates an example data center 1200. In this illustrative example, data center 1200 comprises a number of sleds 1204, which each comprise a quantity of physical memory resources 1260 such as volatile memory and/or non-volatile memory. Physical memory resources 1260 can be like physical memory resources 1160 of FIG. 11 and can be implemented with any of the memory types described above in conjunction with FIG. 11. Date center 1200 includes sleds 1204-1, 1204-2 and 1204-3 where sleds 1204-1 and 1204-2 each include physical memory resources and compute resources. Sleds 1204-1 and 1204-2 each include physical memory resources 1260-1 and 1260-2, respectively and compute resources 1205-1 and 1205-2, respectively.

Sled 1204-3 includes physical memory resources 1260-3. The physical compute resources 1205 of each of sleds 1204-1 and 1204-2 are coupled to respective physical memory resources 1260 of each sled. For example, physical compute resources 1205-1 of sled 1204-1 are coupled to physical memory resources 1260-1 of sled 1204-1 while physical compute resources 1205-2 of sled 1204-2 are coupled to physical memory resources 1260-2 of sled 1204-2. In this manner, physical compute resources 1205 can utilize (e.g., read, write, or the like) the memory of physical memory resources provided on each respective sled.

In some examples, physical compute resources 1205 can be coupled to physical memory resources 1260 housed on the same sled (e.g., physical compute resources 1205-1 coupled to physical memory resources 1260-1) via a local interface 1228. Local interface 1228 can be implemented according to double-data rate fourth generation (DDR4) synchronous dynamic random-access memory (SDRAM) Specification, Rev. A, published in November 2013.

Furthermore, data center 1200 includes sled 1204-3 having physical memory resources 1260-3. Physical memory resources 1260-3 of sled 1204-3 can be coupled to any combination of the physical compute resources 1205 of the other sleds 1204 in data center 1200. In some examples (e.g., as depicted), physical memory resources 1260-3 can be coupled to physical compute resources 1205-1 via fabric interface 1212 and fabric switch 1214 (e.g., like fabric 412 and fabric switch 414 of FIG. 4). Thus, it may be said that physical memory resources 1260-1 and 1260-2 are "first level memory" resources to respective compute resources 1205-1 and 1205-2 while physical memory resources 1260-3 is "second level memory" resources to the compute resource 1205-1. It is noted, that the terms "first level" and "second level" may not imply a physical or geographic distance between the memories and the compute resources. Instead, the terms "first level" and "second level" are intended to imply a speed, latency, bandwidth, or the like of the memory resources. For example, first level memory (e.g., memory 1260-1 and 1260-2) can be faster (e.g., lower latency, greater operating frequency, higher bandwidth, or the like) than second level memory (e.g., memory 1260-3). In some examples, first level memory 1260-1 and 1260-2 may be faster than second level memory 1260-3 due to the type of memories (e.g., first level memory 1260-1 and 1260-2 can be a different type of memory than second level memory 1260-3) or due to the interconnects 1228 and 1212. Examples are not limited in these contexts. For example, in some implementations, first level memory 1260-1 and 1260-2 can be a type of volatile memory while second level memory 1260-3 can be a type of non-volatile memory, such as, byte-addressable write-in place nonvolatile memory, or the like.

It is noted, that second level memory can be dynamically coupled (e.g., during runtime, at initialization, at provisioning, or the like) to compute resources 1205-1 or 1205-2, based, for example, in memory resource needs of the workloads implemented on each sled. This is described in greater detailed below. However, in general, second level memory 1260-3 could be dynamically coupled to physical compute resources 1205-1 or physical compute resources 1205-2. Furthermore, in some examples, physical compute resources 1205-1 or 1205-2 could include multiple processing component packages (e.g., central processing units, or the like). In such an example, second level memory 1260-3 could be coupled to each processing component package of compute resources 1205 individually or in various combinations. Examples are not limited in this context.

FIG. 13 illustrates an example of data center 1200 of FIG. 12. In the illustrative example of FIG. 13, physical memory resources 1260-3 of sled 1204-3 includes multiple portions. For example, physical memory resources 1260-3 include second level memory portion 1262-1 and second level memory portion 1262-2.

Like the illustrative example of FIG. 12, the physical compute resources 1205 of each of sleds 1204-1 and 1204-2 are coupled to respective physical memory resources 1260 of each sled. For example, physical compute resources 1205-1 of sled 1204-1 are coupled to physical memory resources 1260-1 of sled 1204-1 while physical compute resources 1205-2 of sled 1204-2 are coupled to physical memory resources 1260-2 of sled 1204-2. In this manner, physical compute resources 1205 can utilize (e.g., read, write, or the like) the memory of physical memory resources provided on each respective sled.

In some examples, physical compute resources 1205 can be coupled to physical memory resources 1260 housed on the same sled (e.g., physical compute resources 1205-1 coupled to physical memory resources 1260-1) via a local interface 1228. Local interface 1228 can be implemented in accordance with the double-data rate fourth generation (DDR4) synchronous dynamic random-access memory (SDRAM) Specification, Rev. A, published in November 2013.

Additionally, portions of physical memory resources 1260-3 of sled 1204-3 are coupled to both physical compute resources 1205-1 and 1205-2 of sleds 1204-1 and 1204-2. In particular, second level memory portion 1262-1 is coupled, via fabric 1212 and switch 1214, to physical compute resources 1205-1 of sled 1204-1 while second level memory portion 1262-2 is coupled, via fabric 1212 and switch 1214, to physical compute resources 1205-2 of sled 1204-2. Thus, it may be said that physical memory resources 1260-1 and 1260-2 are "first level memory" resources to respective compute resources 1205-1 and 1205-2 while physical memory resources 1260-3 is "second level memory" resources to both compute resource 1205-1. It is noted, that the terms "first level" and "second level" may not imply a physical or geographic distance between the memories and the compute resources. Instead, the terms "first level" and "second level" are intended to imply a speed, latency, bandwidth, or the like of the memory resources. For example, first level memory (e.g., memory 1260-1 and 1260-2) can be faster (e.g., lower latency, greater operating frequency, higher bandwidth, or the like) than second level memory (e.g., memory 1260-3). In some examples, first level memory 1260-1 and 1260-2 may be faster than second level memory 1260-3 due to the type of memories (e.g., first level memory 1260-1 and 1260-2 can be a different type of memory than second level memory 1260-3) or due to the interconnects 1228 and 1212. Examples are not limited in these contexts. For example, in some implementations, first level memory 1260-1 and 1260-2 can be a type of volatile memory while second level memory 1260-3 can be a type of non-volatile memory, such as, byte-addressable write-in place nonvolatile memory, or the like.

It is noted, that second level memory can be dynamically coupled (e.g., during runtime, at initialization, at provisioning, or the like) to compute resources 1205-1 or 1205-2, based, for example, in memory resource needs of the workloads implemented on each sled. This is described in greater detailed below. Furthermore, the size or quantity of second level memory portions 1262-1 and 1262-2 can be dynamically adjusted. Additionally, in some examples, second level memory portions 1262-1 and 1262-2 may be different (e.g., second level memory portion 1262-1 can be larger in size than second level memory portion 1262-2). With some examples, second level memory portions 1262-1 and 1262-2 may not be contiguously located within physical memory resources 1260-3. Examples are not limited in this context.

Figure 14:
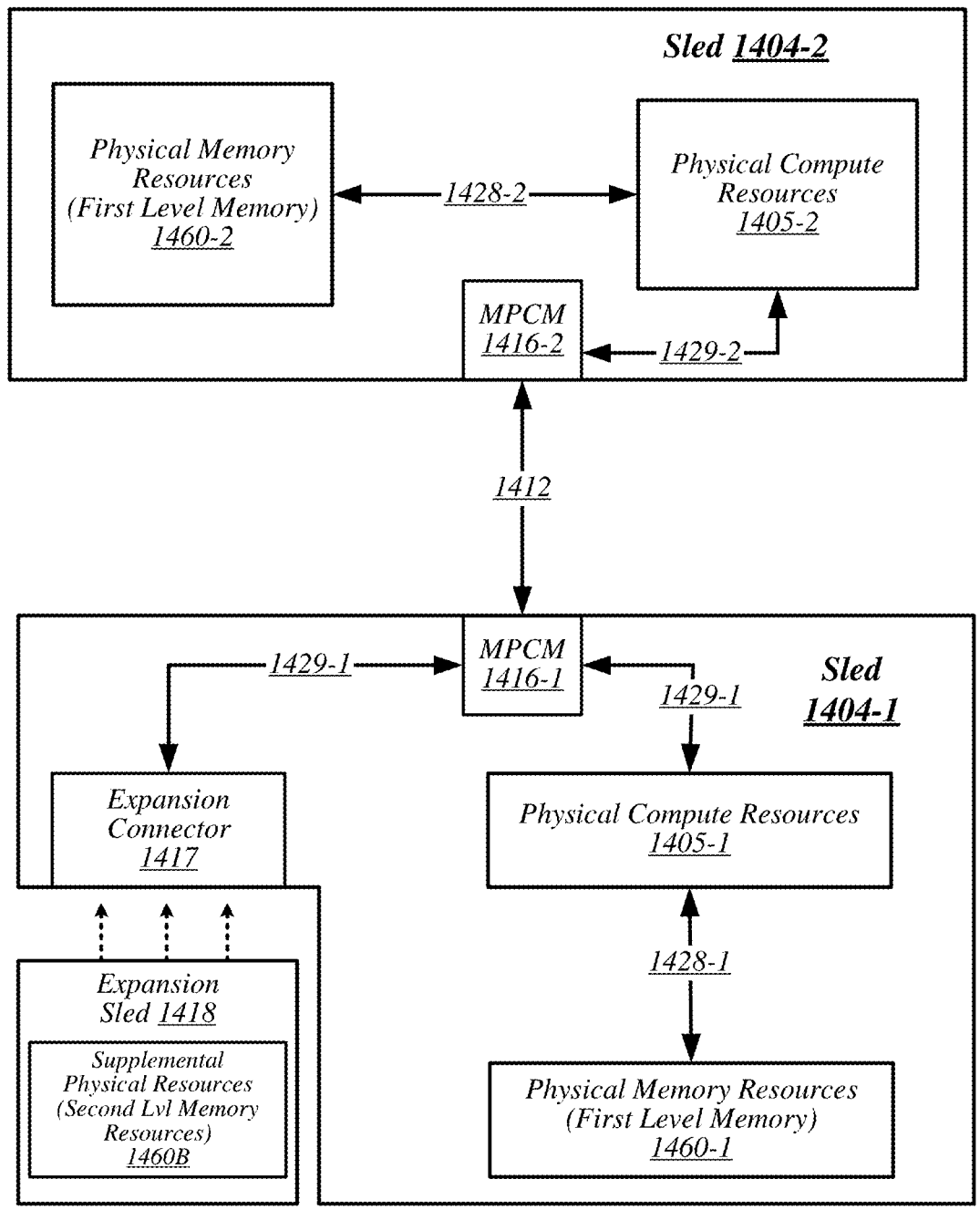
FIG. 14 illustrates a sixth example data center.

FIG. 14 illustrates an example of a data center 1400. In this illustrative example, data center 1400 comprises a number of sleds 1404, which each comprise a quantity of physical memory resources 1460. In general, physical memory resources 1460 can be any of a variety of computer readable memories including volatile memory and/or non-volatile memory. Physical memory resources 1460 can be like physical memory resources 1160 of FIG. 11 and can be implemented with any of the memory types described above in conjunction with FIG. 11.

Data center 1400 includes sleds 1404-1 and 1404-2 where sleds 1404-1 and 1404-2 each include physical memory resources and compute resources. Sleds 1404-1 and 1404-2 each include physical memory resources 1460-1 and 1460-2, respectively and compute resources 1405-1 and 1405-2, respectively.

Sleds 1404-1 and 1404-2 further each include an MPCM 1416-1 and 1416-2, respectively, designed to couple with a counterpart MPCM when sleds 1404-1 and/or 1404-2 are inserted into a sled space, such as any of sled spaces 503-1 to 503-5 of FIG. 5.

An MPCM 1416 of a sled can be coupled to resources on the sled via a high speed interconnect 1429. For example, MPCM 1416-1 is coupled to resources of sled 1404-1 via interconnect 1429-1 while MPCM 1416-2 is coupled to resources of sled 1404-2 via interconnect 1429-2. In some examples, interconnects 1429 can be implemented via dual-mode optical network interface circuitry and optical signaling media (e.g., circuitry 926 and optical signaling media 925 of FIG. 9, or the like). Thus sleds 1404-1 and 1404-2 can be coupled via a fabric 1412 (e.g., like fabric 412 of FIG. 4) and MPCMs 1416-1 and 1416-2.

Interconnect 1429 could be implemented in accordance with the Peripheral Component Interconnect (PCI) Express Base Specification, revision 3.1a, published in December 2015 ("PCI Express specification" or "PCIe specification") or the PCIe Generation 4 Specification to be released in 2017, or another proprietary high speed interconnect.

Physical compute resources 1405 can be coupled to physical memory resources 1460 (e.g., first level memory) via local interfaces 1428. For example, physical compute resources 1405-1 can be coupled to physical memory resources 1460-1 via local interface 1428-1 while physical compute resources 1405-2 can be coupled to physical memory resources 1460-2 via local interface 1428-2. Local interfaces 1428-1 and 1428-2 can be implemented according to double-data rate fourth generation (DDR4) synchronous dynamic random-access memory (SDRAM) Specification, Rev. A, published in November 2013.

Sled 1404-1 may also feature an expansion connector 1417. Expansion connector 1417 may generally comprise a socket, slot, or other type of connection element that is capable of accepting one or more types of expansion modules, such as an expansion sled 1418. By coupling with a counterpart connector on expansion sled 1418, expansion connector 1417 may provide physical compute resources 1405-1 with access to supplemental physical memory resources 1460B residing on expansion sled 1418. Furthermore, coupling sleds 1404-1 and 1404-2 via fabric 1412 and interconnects 1429-1 and 1429-2 can provide physical compute resources 1405-2 of sled 1404-2 access to second level memory 1460B.

In general, supplemental physical memory resources 1460B can be any of a variety of computer readable memories such as volatile memory and/or non-volatile memory. In illustrative examples, physical memory resources 1460B can be non-volatile memory, such as, for example, byte-addressable write-in place non-volatile memory.

Thus physical compute resources 1405 of each sled 1404 can be coupled to local first level memory 1460 and also coupled to second level memory 1460B. In particular, physical compute resources 1405-1 can be coupled to first level memory 1460-1 via local interface 1428-1 and second level memory 1460B via interconnect 1429-1. Additionally, physical compute resources 1405-2 can be coupled to first level memory 1460-2 via local interfaces 1428-2 and second level memory 1460B via interconnect 1429-2, fabric 1412, and interconnect 1429-1.

Figure 15A:
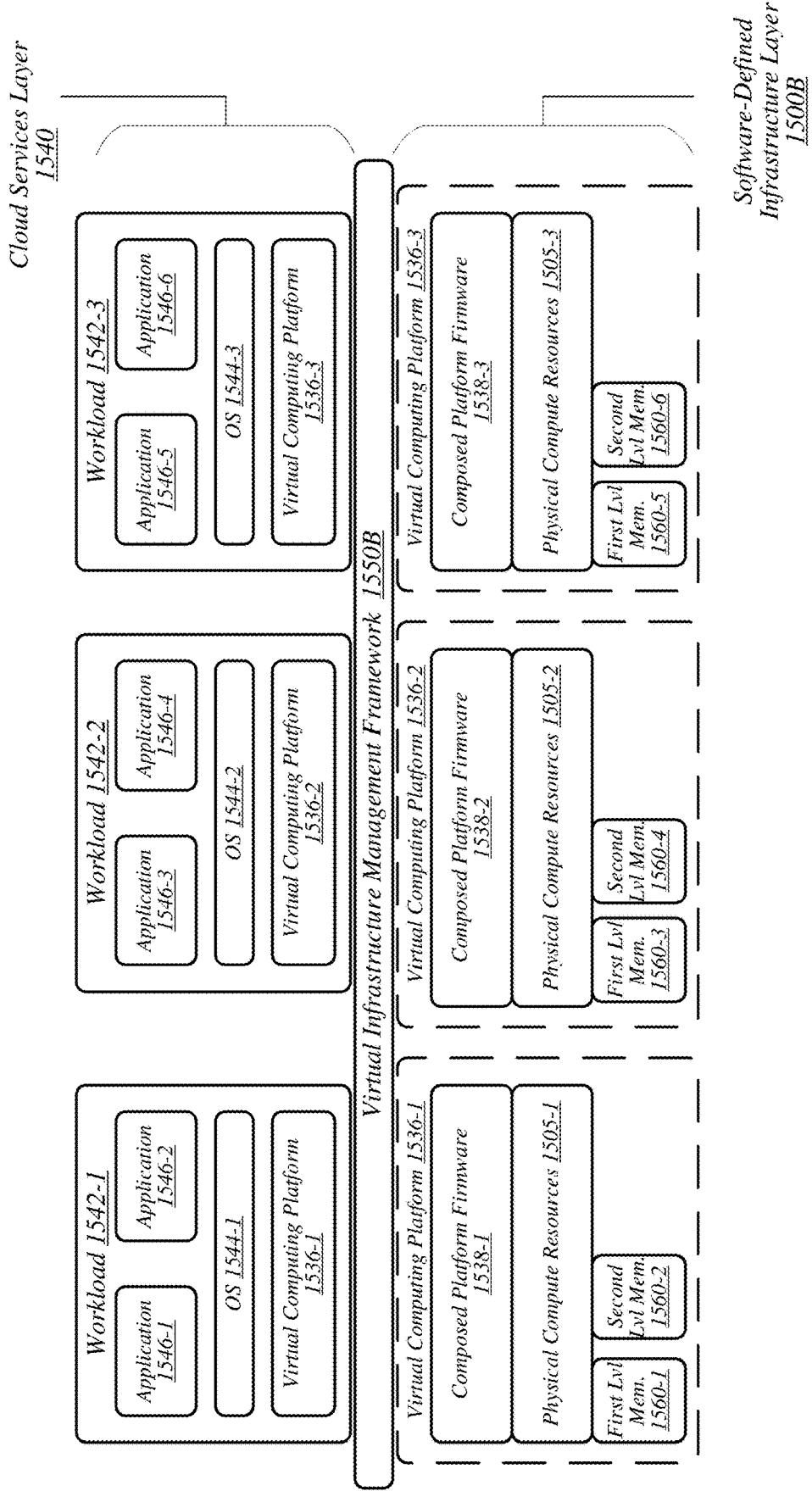
FIGS. 15A-15C illustrate a seventh example data center.
Figure 15B:
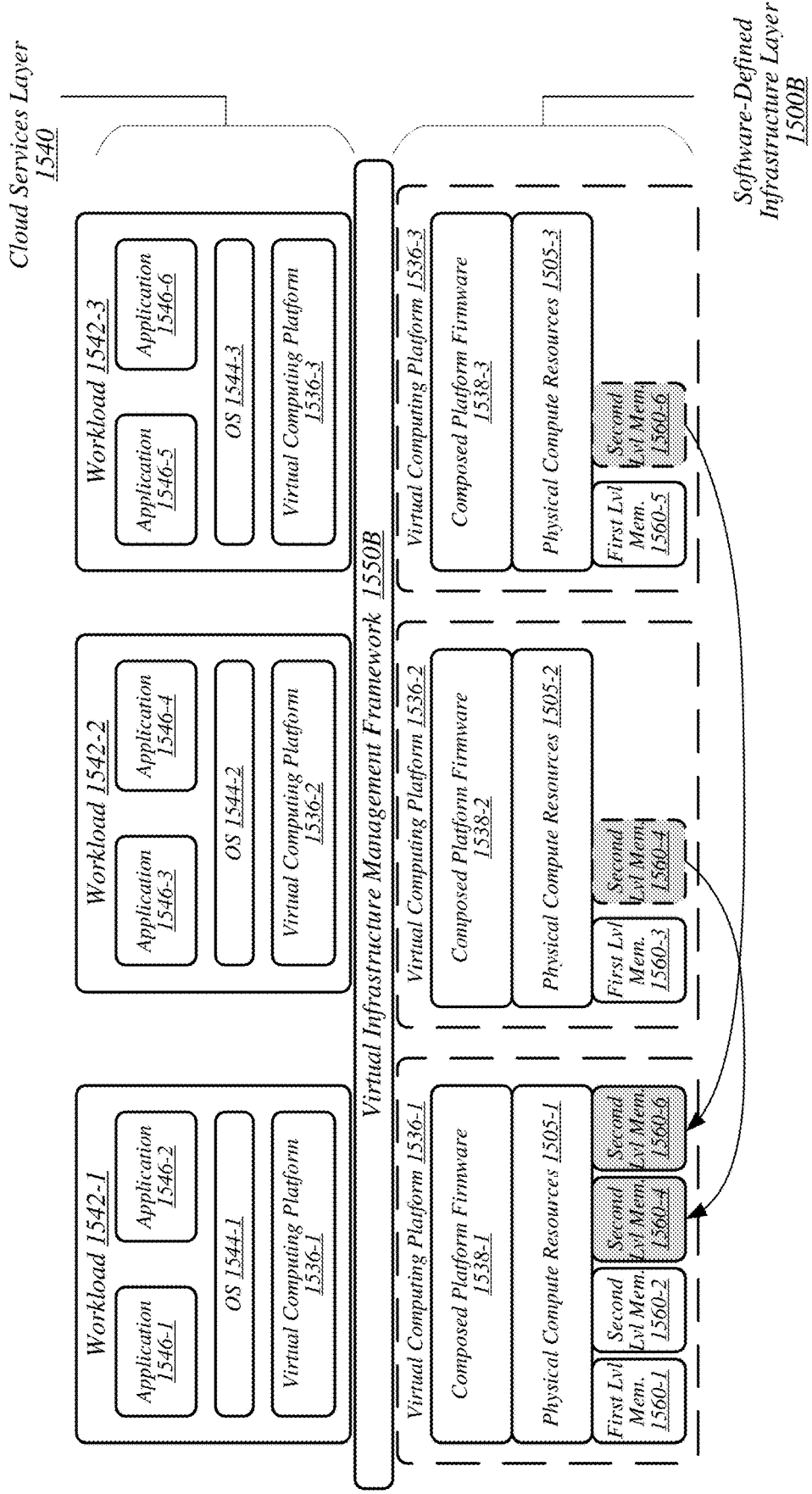
Figure 15C:
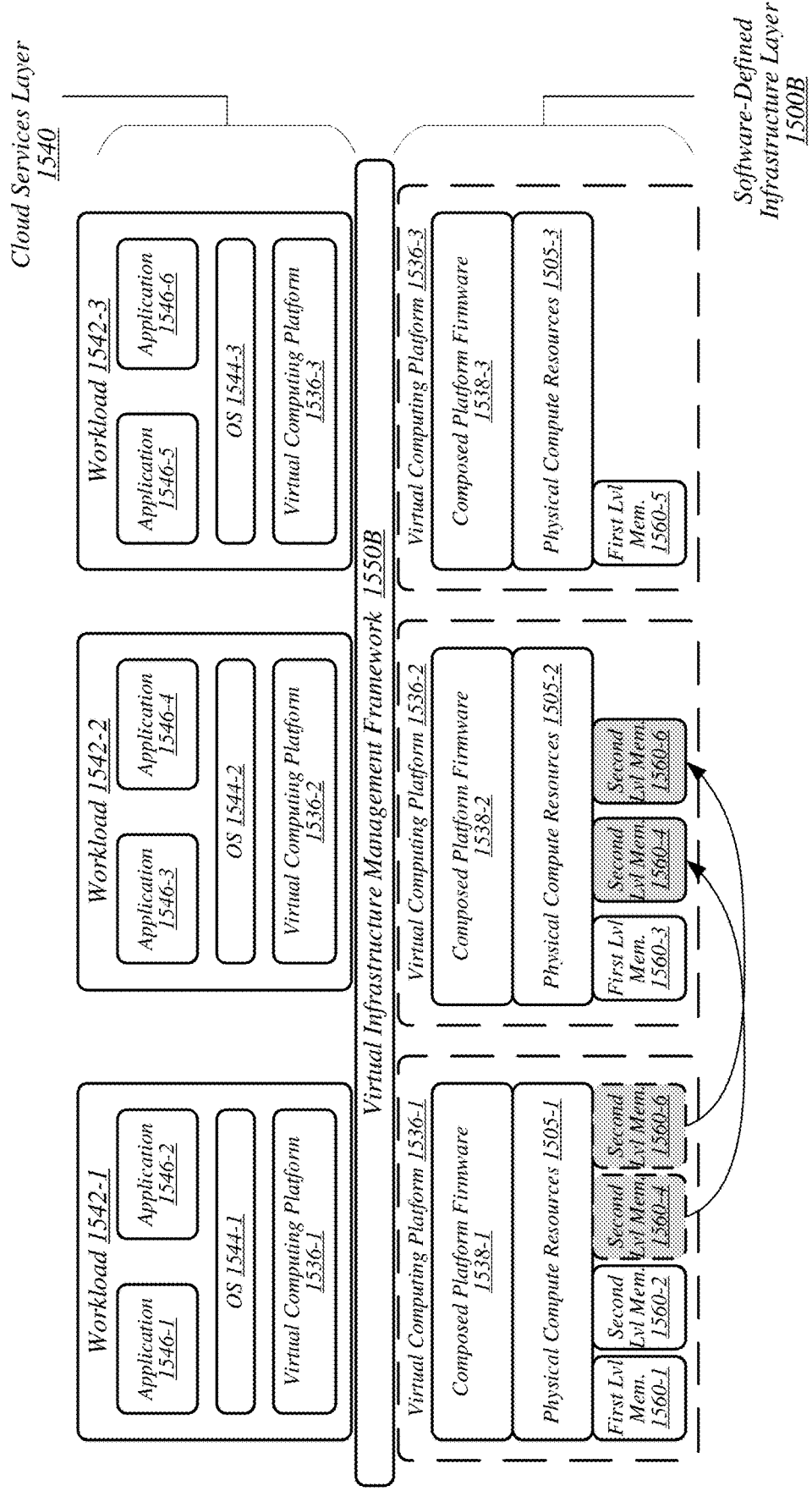

FIGS. 15A, 15B and 15C illustrate examples of a data center 1500, with virtual computing platforms composed from physical resources of the data center. In general, virtual infrastructure management framework 1550B (e.g., a Hypervisor, or the like) can compose virtual computing platforms of software-defined infrastructure 1500B. For example, software-defined infrastructure 1500B includes virtual computing platform 1536-1, virtual computing platform 1536-2 and virtual computing platform 1536-3. The number of virtual computing platforms 1536 depicted in this figure, and their arrangement is given for illustration purposes only and not to be limiting. As described previously, the virtual computing platforms 1536-1 to 1536-3 are composed from physical resources (e.g., physical resources 206 of FIG. 2, or the like) of data center 1500. For example, virtual infrastructure management framework 1550B can compose virtual computing platform 1536-1 to include physical computing resources 1505-1, first level memory 1560-1 and second level memory 1560-2; virtual computing platform 1536-2 to include physical computing resources 1505-2, first level memory 1560-3 and second level memory 1560-4; and virtual computing platform 1536-3 to include physical computing resources 1505-3, first level memory 1560-5 and second level memory 1560-6.

It is noted, the virtual computing platforms 1536 are not depicted including physical accelerator resources or physical storage resources, for purposes of clarity of presentation only. However, during practice, the virtual computing platforms 1536 can be composed with any number and combination of physical resources of the data center. Examples are not limited in this context.

In general, second level memory resources 1560 from a specific virtual computing platform 1536 can be coupled to the physical compute resources 1505 from that particular platform via various interconnects, fabrics, and/or fabric switches, for example, as described with respect to FIGS. 12 to 14. For example, virtual infrastructure management framework 1550B can pool second level memory resources and allocate portions of such pooled memory resources to physical compute resources, which may be located on another sled in the data center, to form virtual computing platforms. Virtual infrastructure management framework 1550B can be configured to couple second level memory resources of sled to compute resources of another sled via switches (e.g. like switch 1140 of FIG. 11, or the like) or expansion connectors (e.g., expansion connector 1417 of FIG. 14, or the like).

The virtual computing platforms can be configured to implement firmware of operating system(s) upon which services (e.g., SaaS, PaaS, IaaS, or the like) can be provided. As depicted, virtual computing platforms 1536-1 to 1536-3 are depicted virtual platform firmware 1538-1, 1538-2 and 1538-3, respectively. Virtual platform firmware 1538-1 to 1538-3 can be configured to facilitate cloud services layer 1540. Cloud service layer 1540 can be provided to execute various workloads (e.g., virtual machines, containers, or the like). For example, workloads 1542-1, 1542-2 and 1542-3 are depicted implemented upon virtual computing platforms 1536-1, 1536-2 and 1536-3, respectively. Workloads can implement an operating system (OS) and can execute various applications. For example, workload 1542-1 is depicted implementing OS 1544-1 and executing applications 1546-1 and 1546-2; workload 1542-2 is depicted implementing OS 1544-2 and executing applications 1546-3 and 1546-4; and workload 1542-3 is depicted implementing OS 1544-3 and executing applications 1546-5 and 1546-6.

During operation, as the needs of each workload change, the physical memory resources, and particularly second level memory resources 1560-2, 1560-4, and 1560-6 can be dynamically allocated to particular virtual computing platforms. For example, workloads 1542-1 to 1542-3 can have different computational requirements, be subject to different service level agreements, or the like. All of which, can change the needs and/or requirements of the data center 1500. That is, virtual infrastructure management framework 1550B can allocate portions of the second level memory resources to each virtual computing platform 1536 based on the needs of the workloads 1542 with which the virtual computing platforms 1536 are to execute. As another example, virtual infrastructure management framework 1550B can allocate portions of the second level memory resources to each virtual computing platform 1536 based on the amount of first level memory with which each virtual computing platform includes. For example, in some implementations, first level memory may act as a cache to second level memory. In such implementations, virtual infrastructure management framework 1550B can allocate portions of the second level memory resources to achieve a desired ratio of first level memory to second level memory. As a specific, non-limiting example, virtual infrastructure management framework 1550B can allocate second level memory resources to each virtual computing platform 1536 to achieve a 1:8 ratio of first level memory to second level memory (e.g., 8 Gigabytes (Gb) of second level memory per 1 Gb of first level memory), to achieve a 1:16 ratio of first level memory to second level memory (e.g., 16 Gb of second level memory per 1 Gb of first level memory), or to achieve a 1:32 ratio of first level memory to second level memory (e.g., 32 Gb of second level memory per 1 Gb of first level memory). Examples are not limited in this context.

Turning more particularly to FIG. 15B, the virtual infrastructure management framework 1550B has dynamically allocated (e.g., during runtime, or the like) physical memory resources 1560-4 and 1560-6 to virtual computing platform 1536-1. Said differently, virtual infrastructure management framework 1550B can allocate physical memory resources 1560-4 and 1560-6 to virtual computing platform 1536-1. As such, even though physical memory resources 1560-4 and 1560-6 might be coupled (e.g., as expansion sleds, or the like) to physical compute resources composed in other virtual computing platforms (e.g., physical compute resources 1505-2 and 1505-3, or the like) the virtual computing platform 1536-1 can be composed to include the physical memory resources (second level memory) 1560-4 and 1560-6. Furthermore, it is worth noting that physical memory resources can be allocated to a virtual computing platform where the physical memory resources and the physical compute resources are on different sleds and even different racks. For example, physical compute resources 1105-1 could be on a different sled than any of the physical memory resources (e.g., 1560-2, 1560-4, 1560-6, etc.), despite such resources being composed into a single platform. Examples are not limited in this context.

Turning more particularly to FIG. 15C, the virtual infrastructure management framework 1550B has dynamically allocated (e.g., during runtime, or the like) physical memory resources 1560-4 and 1560-6 to virtual computing platform 1536-2. Said differently, virtual infrastructure management framework 1550B can allocate physical memory resources 1560-4 and 1560-6 to virtual computing platform 1536-2. As such, even though physical memory resources 1560-4 and 1560-6 might have been included, allocated and/or composed with virtual computing platform 1536-1, they can be dynamically allocated to another platform, such as, for example, virtual computing platform 1536-2. With some examples, the physical accelerator resources 1560-4 and 1560-6 can be coupled to physical compute resource 1505-2 via an optical fabric (e.g., optical fabric 412, or the like). Accordingly, any one of the virtual computing platforms can be composed with and/or dynamically allocated any number of the physical accelerator resources within data center 1500.

It is noted, the present disclosure provides an advantage over prior art such data centers in that less physical memory resources are needed within a data center. More specifically, a virtual computing platform can include local first level memory and be dynamically allocated second level memory, regardless of whether the second level memory resources are physically attached and/or coupled to the compute resources allocated to the platform. Such allocations can be dynamic and take place during run time of the data center. Said differently, the physical memory resources can be added and/or removed to already composed virtual compute platforms or added and/or removed to existing virtual compute platforms when preparing such platforms to execute a workload.

As such, data centers implemented according to the present disclosure can be provisioned with less total physical memory resources than conventional data centers but provide greater performance. More specifically, a data center (e.g., data center 1500) can be provisioned with the number of physical memory resources that might be simultaneously needed by workloads (e.g., workloads 1542-1, 1542-2, 1542-3, or the like). Conversely, with conventional techniques, the data center 1500 would need to be provisioned with the total number of physical memory resources that each workload would need at any given time.

Included herein is a logic flow representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 16 illustrates an example logic flow 1600. Logic flow 1600 may be representative of some or all of the operations executed by one or more logic, features, or devices described herein, such as data centers 1200, 1400, 1500, or the like. More particularly, logic flow 1600 may be implemented by at least virtual infrastructure management framework 1550B to dynamically allocate second level memory to a virtual computing platform.

Logic flow 1600 can begin at block 1610. At block 1610 "compose virtual computing platforms from physical compute resources and physical memory resources, each of the virtual computing platforms to comprise at least one of the physical compute resources and a portion of the physical memory resources coupled to the at least one of the physical compute resources as first level memory" a number of virtual computing platforms can be composed from physical compute resources and physical memory resources, where each of the virtual computing platforms can include one of the plurality of physical compute resources and a portion of the physical memory resources coupled to the physical compute resource as first level memory. For example, virtual infrastructure management framework 1150B can compose virtual computing platforms 1536-1 to 1536-3 from physical compute resources 1505-1 to 1505-3, respectively and first level memory 1560-1, 1560-3, and 1560-5.

Continuing to block 1620 "dynamically allocate a portion of the physical memory resources to a one of the virtual computing platforms as second level memory" a portion of the physical memory resources can be dynamically allocated to a one (e.g., a different one than presently allocated, or the like) of the virtual computing platforms as second level memory to the virtual computing platform. For example, as depicted in FIG. 11B, virtual infrastructure management framework 1150B can dynamically allocate physical memory resources 1560-4 and 1560-6 from virtual computing platforms 1536-2 and 1536-3 to virtual computing platform 1536-1 as second level memory. In particular, the memory resources can be dynamically allocated to a virtual computing platform and coupled to physical compute resources of the platform as second level memory to the physical compute resources.

Figure 17:
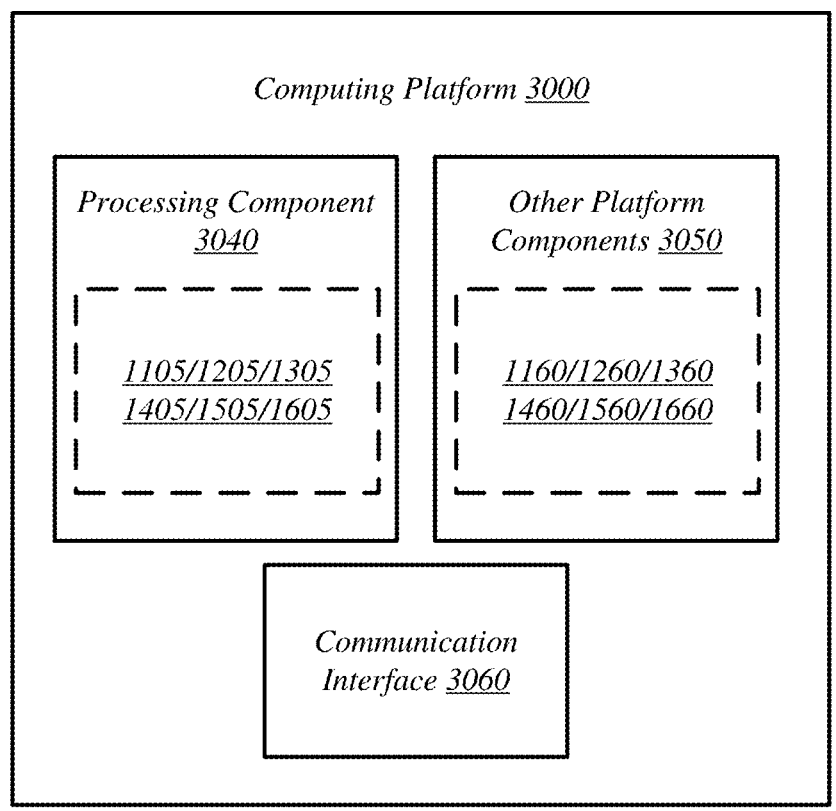
FIG. 17 illustrates an example computing platform.

FIG. 17 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may include hardware or logic for apparatus described herein, such as, physical compute resources (e.g., 1105, 1205, 1305, 1405, 1505, 1605, or the like). Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units (e.g., first level and second level memory (e.g., 1160, 1260, 1360, 1460, 1560, 1660, or the like)), chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

A system for a data center comprising: a rack comprising a plurality of sled spaces; and at two or more compute sleds coupled to the rack via at two or more of the plurality of sled spaces, each of the two or more compute sleds comprising: at least one physical compute resource; a set of physical first level memory resources coupled to the at least one physical compute resource; and a compute sled fabric interface; and a memory resource sled coupled to the rack via another one of the plurality of sled spaces different than the two or more of the plurality of sled spaces, the memory resource sled comprising: a set of physical second level memory resources; and a second level memory sled fabric interface to couple a portion of the set of physical second level memory resources to each of the at least one physical compute resources of the two or more compute sleds via a fabric and the compute sled fabric interfaces.

Example 2

The system of example 1, the sets of physical first level memory resources comprising volatile memory.

Example 3

The system of example 2, the set of physical second level memory resources comprising byte-addressable write-in place nonvolatile memory.

Example 4

The system of example 1, each of the at least one physical compute resources comprising a central processing unit, a field programmable gate array, a graphics processing unit, or an application specific integrated circuit.

Example 5

The system of example 1, each of the two or more compute sleds comprising a first memory controller to couple the at least one physical compute resource to at least one of the set of physical first level memory resources or the portion of the set of physical second level memory resources.

Example 6

The system of example 5, each of the two or more compute sleds comprising a second memory controller, the first memory controller to couple the at least one physical compute resource to the set of physical first level memory resources and the second memory controller to couple the at least one physical compute resource to the portion of the set of physical second level memory resources.

Example 7

The system of example 1, the at least one physical compute resource of each of the two or more compute sleds coupled to the set of physical first level memory resources via a local interface, the local interface a peripheral component interconnect express compliant standard interface.

Example 8

The system of example 1, the fabric an optical fabric.

Example 9

The system of example 1, comprising a virtual infrastructure management framework to dynamically allocate the portions of the physical second level memory resources to each of the two or more compute sleds.

Example 10

An apparatus for a compute resource sled of a data center, comprising: at least one physical compute resource; a set of physical first level memory resources coupled to the at least one physical compute resource; and a first fabric interface, the first fabric interface to couple the at least one physical compute resource to a portion of a set of physical second level memory resources via a fabric, the set of physical second level memory resources to be shared between the compute resource sled and another compute resource sled of the data center.

Example 11

The apparatus of example 10, the first set of physical memory resources comprising volatile memory.

Example 12

The apparatus of example 11, the second set of physical memory resources comprising three-dimensional (3D) cross-point memory.

Example 13

The apparatus of example 10, the at least one physical compute resource comprising a central processing unit, a field programmable gate array, a graphics processing unit, or an application specific integrated circuit.

Example 14

The apparatus of example 10, comprising a first memory controller to couple the at least one physical compute resource to at least one of the set of physical first level memory resources or portion of the set of physical second level memory resources.

Example 15

The apparatus of example 14, comprising a second memory controller, the first memory controller to couple the at least one physical compute resource to the set of physical first level memory resources and the second memory controller to couple the at least one physical compute resource to the portion of the set of physical second level memory resources.

Example 16

The apparatus of example 10, the at least one physical compute resource coupled to the set of physical first level memory resources via a local interface, the local interface a peripheral component interconnect express compliant standard interface.

Example 17

The apparatus of example 10, the fabric an optical fabric.

Example 18

A method comprising: allocating a first portion of a set of physical second level memory resources to a first compute sled; allocating a second portion of the set of physical second level memory resources different than the first portion to a second compute sled; coupling, via a fabric, at least one physical compute resource of the first compute sled to the first portion of the set of physical second level memory resources; and coupling, via the fabric, at least one physical compute resource of the second compute sled to the second portion of the set of physical second level memory resources.

Example 19

The method of example 18, the set of physical second level memory resources comprising three-dimensional (3D) cross-point memory.

Example 20

The method of example 18, the at least one physical compute resource comprising a central processing unit, a field programmable gate array, a graphics processing unit, or an application specific integrated circuit.

Example 21

The method of example 18, comprising: composing a first virtual compute platform from the at least one physical compute resource of the first compute sled and the first portion of the set of physical second level memory resources; and allocating the first portion of the set of physical second level memory resources to the first compute sled based on a workload to be executed by the first virtual compute platform.

Example 22

The method of example 21, comprising: composing a second virtual compute platform from the at least one physical compute resource of the second compute sled and the second portion of the set of physical second level memory resources; and allocating the second portion of the set of physical second level memory resources to the second compute sled based on a workload to be executed by the second virtual compute platform.

Example 23

The method of example 22, comprising adjusting the allocation of at least one of the first portion of the set of physical second level memory resources or the second portion of the set of physical second level memory resources.

Example 24

The method of example 18, each of the first compute sled and the second compute sled comprising a set of physical first level memory resources, allocating the first portion of the set of physical second level memory resources to the first compute sled based on a quantity of the set of physical first level memory resources of the first compute sled and allocating the second portion of the set of physical second level memory resources to the second compute sled based on a quantity of the set of physical first level memory resources of the second compute sled.

Example 25

The method of example 24, comprising allocating the portions of the set of physical second level memory resources to the first and the second compute sleds to achieve a ratio of the quantity to the sets of physical first level memory resources to a quantity of the portions of the set of physical second level memory resources.

Example 26

An apparatus comprising means to implement the method of any one of examples 18 to 25.

Example 27

A computer-readable medium comprising instructions that when executed by a processor of a data center infrastructure manager cause the processor to implement the method of any one of examples 18 to 25.

Example 28

At least one non-transitory machine readable medium comprising a plurality of instructions that in response to being executed by a processor of a virtual infrastructure management framework of a data center cause the virtual infrastructure management framework to: allocate a first portion of a set of physical second level memory resources to a first compute sled; allocate a second portion of the set of physical second level memory resources different than the first portion to a second compute sled; couple, via a fabric, at least one physical compute resource of the first compute sled to the first portion of the set of physical second level memory resources; and couple, via the fabric, at least one physical compute resource of the second compute sled to the second portion of the set of physical second level memory resources.

Example 29

The at least one non-transitory machine readable medium of example 28, the set of physical second level memory resources comprising byte-addressable write-in place non-volatile memory.

Example 30

The at least one non-transitory machine readable medium of example 28, each of the at least one physical compute resources comprising a central processing unit, a field programmable gate array, a graphics processing unit, or an application specific integrated circuit.

Example 31

The at least one non-transitory machine readable medium of example 27, comprising instructions that in response to being executed by the processor of the virtual infrastructure management framework cause the virtual infrastructure management framework to: compose a first virtual compute platform from the at least one physical compute resource of the first compute sled and the first portion of the set of physical second level memory resources; and allocate the first portion of the set of physical second level memory resources to the first compute sled based on a workload to be executed by the first virtual compute platform.

Example 32

The at least one non-transitory machine readable medium of example 31, comprising instructions that in response to being executed by the processor of the virtual infrastructure management framework cause the virtual infrastructure management framework to: compose a second virtual compute platform from the at least one physical compute resource of the second compute sled and the second portion of the set of physical second level memory resources; and allocate the second portion of the set of physical second level memory resources to the second compute sled based on a workload to be executed by the second virtual compute platform.

Example 33

The at least one non-transitory machine readable medium of example 32, comprising instructions that in response to being executed by the processor of the virtual infrastructure management framework cause the virtual infrastructure management framework to adjust the allocation of at least one of the first portion of the set of physical second level memory resources or the second portion of the set of physical second level memory resources.

Example 34

The at least one non-transitory machine readable medium of example 27, each of the first compute sled and the second compute sled comprising a set of physical first level memory resources, the medium comprising instructions that in response to being executed by the processor of the virtual infrastructure management framework cause the virtual infrastructure management framework to allocate the first portion of the set of physical second level memory resources to the first compute sled based on a quantity of the set of physical first level memory resources of the first compute sled and allocate the second portion of the set of physical second level memory resources to the second compute sled based on a quantity of the set of physical first level memory resources of the second compute sled.

Example 35

The at least one non-transitory machine readable medium of example 34, comprising instructions that in response to being executed by the processor of the virtual infrastructure management framework cause the virtual infrastructure management framework to allocate the portions of the set of physical second level memory resources to the first and the second compute sleds to achieve a ratio of the quantity to the sets of physical first level memory resources to a quantity of the portions of the set of physical second level memory resources.

The invention claimed is:
1. A system for a data center comprising:
a rack comprising a plurality of sled spaces;
at least two or more compute sleds coupled to the rack via at least two or more of the plurality of sled spaces, each of the two or more compute sleds comprising:
at least one physical compute resource;
a set of physical first level memory resources coupled to the at least one physical compute resource;
a first compute sled memory controller to couple the at least one physical compute resource to the set of physical first level memory resources;
a second compute sled memory controller to couple the at least one physical compute resource to a portion of a set of physical second level memory resources; and
a compute sled fabric interface to couple to a fabric; and
a memory resource sled coupled to the rack via another one of the plurality of sled spaces different than the two or more of the plurality of sled spaces, the memory resource sled comprising:
the set of physical second level memory resources; and
a second level memory sled fabric interface to couple, to each of the at least one physical compute resources of the two or more compute sleds via the fabric and the compute sled fabric interfaces, a portion of the set of physical second level memory resources, the portion of the set of physical second level memory resources coupled to a first one of the at least two or more compute sleds different than the portion of the set of physical second level memory resources coupled to a second one of the at least two or more compute sleds.

2. The system of claim 1, the sets of physical first level memory resources comprising volatile memory.

3. The system of claim 2, the set of physical second level memory resources comprising byte-addressable write-in place nonvolatile memory.

4. The system of claim 1, each of the at least one physical compute resources comprising a central processing unit, a field programmable gate array, a graphics processing unit, or an application specific integrated circuit.

5. The system of claim 1, the at least one physical compute resource of each of the two or more compute sleds coupled to the set of physical first level memory resources via a local interface, the local interface a peripheral component interconnect express compliant standard interface.

6. The system of claim 1, the fabric an optical fabric.

7. The system of claim 1, comprising a virtual infrastructure management framework to dynamically allocate the portions of the physical second level memory resources to each of the two or more compute sleds.

8. The system of claim 1, wherein the portion of the set of physical second level memory resources coupled to the first one of the at least two or more compute sleds to be dynamically adjusted based on a workload to be executed on the at least one physical compute resource of the first one of the at least two or more compute sleds.

9. An apparatus for a compute resource sled of a data center, comprising:
at least one physical compute resource;
a set of physical first level memory resources coupled to the at least one physical compute resource;
a first compute sled memory controller to couple the at least one physical compute resource to the set of physical first level memory resources;
a fabric interface, the fabric interface to couple the at least one physical compute resource to a portion of a set of physical second level memory resources via a fabric, the set of physical second level memory resources to be shared between the compute resource sled and another compute resource sled of the data center; and
a second compute sled memory controller to couple the at least one physical compute resource to the portion of the set of physical second level memory resources, the portion of the set of physical second level memory resources coupled to the compute resource sled of the data center different than the portion of the set of physical second level memory resources coupled to the other compute resource sled of the data center.

10. The apparatus of claim 9, the first set of physical memory resources comprising volatile memory.

11. The apparatus of claim 10, the second set of physical memory resources comprising three-dimensional (3D) cross-point memory.

12. The apparatus of claim 9, the at least one physical compute resource comprising a central processing unit, a field programmable gate array, a graphics processing unit, or an application specific integrated circuit.

13. The apparatus of claim 9, the at least one physical compute resource coupled to the set of physical first level memory resources via a local interface, the local interface a peripheral component interconnect express compliant standard interface.

14. The apparatus of claim 9, the fabric an optical fabric.

15. The apparatus of claim 9, wherein the portion of the set of physical second level memory resources coupled to the compute resource sled of the data center to be dynamically adjusted based on a workload to be executed on the at least one physical compute resource of the compute resource sled of the data center.

16. A method comprising:
allocating a first portion of a set of physical second level memory resources to a first one of a plurality of compute sleds;
allocating a second portion of the set of physical second level memory resources, different than the first portion of the set of physical second level memory resources, to a second one of the plurality of compute sleds;
coupling, via a fabric, at least one physical compute resource of the first one of the plurality of compute sleds to the first portion of the set of physical second level memory resources; and
coupling, via the fabric, at least one physical compute resource of the second one of the plurality of compute sleds to the second portion of the set of physical second level memory resources, wherein each compute sled of the plurality of compute sleds comprise: a first compute sled memory controller to couple the at least one physical compute resource of the compute sled to a set of physical first level memory resources of the compute sled, a fabric interface to couple the at least one physical compute resource of the compute sled to the respective portion of the set of physical second level memory resources via the optical fabric, and a second compute sled memory controller to couple the at least one physical compute resource of the compute sled to the respective portion of the set of physical second level memory resources.

17. The method of claim 16, the set of physical second level memory resources comprising three-dimensional (3D) cross-point memory.

18. The method of claim 16, the at least one physical compute resource comprising a central processing unit, a field programmable gate array, a graphics processing unit, or an application specific integrated circuit.

19. The method of claim 16, comprising:
composing a first virtual compute platform from the at least one physical compute resource of the first compute sled and the first portion of the set of physical second level memory resources; and
allocating the first portion of the set of physical second level memory resources to the first compute sled based on a workload to be executed by the first virtual compute platform.

20. The method of claim 19, comprising:
composing a second virtual compute platform from the at least one physical compute resource of the second compute sled and the second portion of the set of physical second level memory resources; and
allocating the second portion of the set of physical second level memory resources to the second compute sled based on a workload to be executed by the second virtual compute platform.

21. The method of claim 20, comprising adjusting the allocation of at least one of the first portion of the set of physical second level memory resources or the second portion of the set of physical second level memory resources.

22. The method of claim 16, each of the first compute sled and the second compute sled comprising a set of physical first level memory resources, allocating the first portion of the set of physical second level memory resources to the first compute sled based on a quantity of the set of physical first level memory resources of the first compute sled and allocating the second portion of the set of physical second level memory resources to the second compute sled based on a quantity of the set of physical first level memory resources of the second compute sled.

23. The method of claim 22, comprising allocating the portions of the set of physical second level memory resources to the first and the second compute sleds to achieve a ratio of the quantity to the sets of physical first level memory resources to a quantity of the portions of the set of physical second level memory resources.

24. The method of claim 16, comprising dynamically adjusting the first portion of the set of physical second level memory resources based on a workload to be executed on the at least one physical compute resource of the first one of the plurality of compute sleds.

* * * * *